US007343166B2

(12) United States Patent
Fukui et al.

(10) Patent No.: US 7,343,166 B2
(45) Date of Patent: Mar. 11, 2008

(54) MONITOR SYSTEM, TERMINAL UNIT, MONITOR SYSTEM CONTROL METHOD, TERMINAL UNIT CONTROL METHOD, TERMINAL UNIT CONTROL PROGRAM, COMPUTER-READABLE RECORDING MEDIUM HAVING THE TERMINAL UNIT CONTROL PROGRAM, ADMINISTRATIVE APPARATUS, ADMINISTRATIVE APPARATUS CONTROL METHOD

(75) Inventors: Takeshi Fukui, Matsumoto (JP); Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 491 days.

(21) Appl. No.: 11/104,456

(22) Filed: Apr. 13, 2005

(65) Prior Publication Data

US 2005/0250517 A1 Nov. 10, 2005

(30) Foreign Application Priority Data

Apr. 15, 2004 (JP) ............................ 2004-120329

(51) Int. Cl.
*H04Q 7/20* (2006.01)

(52) U.S. Cl. .............................. 455/456.1; 455/404.2; 455/456.3; 455/457

(58) Field of Classification Search ............ 455/456.1, 455/456.2, 456.3, 457, 404.2
See application file for complete search history.

(56) References Cited

FOREIGN PATENT DOCUMENTS

| | | | |
|---|---|---|---|
| GB | 2305285 | A | 4/1997 |
| GB | 2306736 | A | 5/1997 |
| GB | 2320973 | A | 7/1998 |
| JP | 2002-331914 | | 11/2002 |
| JP | 2003-027529 | | 1/2003 |
| JP | 2003-046423 | | 2/2003 |
| JP | 2004-046741 | A | 2/2004 |
| JP | 2004-106802 | | 4/2004 |
| WO | WO 02/35492 | | 5/2002 |

*Primary Examiner*—Duc M. Nguyen
*Assistant Examiner*—Dai Phuong
(74) *Attorney, Agent, or Firm*—Global IP Counselors, LLP

(57) ABSTRACT

A terminal unit is attached to a monitoring object. The terminal unit locates its position via a position-related signal from a satellite positioning system. The terminal unit acquires first-located position information first, and then second-located position information upon a lapse of a predetermined positioning interval after the first-located position information is acquired. When the first-located position is within a permissible moving zone and the second-located position is outside the permissible moving zone, the terminal unit acquires third-located position information before the predetermine positioning interval lapses. If the third-located position is still outside the permissible moving zone, then the terminal unit sends a reporting signal to a monitor apparatus. The monitor system reduces occurrences of inaccurate reporting signals.

20 Claims, 13 Drawing Sheets

FIRST-LOCATED-POSITION INFORMATION (145,203) : POSITION WITHIN MONITOR ZONE

SECOND-LOCATED-POSITION INFORMATION (147,205) : POSITION OUTSIDE MONITOR ZONE

THIRD-LOCATED-POSITION INFORMATION (148,209) : POSITION OUTSIDE MONITOR ZONE

MONITOR SYSTEM, TERMINAL UNIT, MONITOR SYSTEM CONTROL METHOD, TERMINAL UNIT CONTROL METHOD, TERMINAL UNIT CONTROL PROGRAM, COMPUTER-READABLE RECORDING MEDIUM HAVING THE TERMINAL UNIT CONTROL PROGRAM, ADMINISTRATIVE APPARATUS, ADMINISTRATIVE APPARATUS CONTROL METHOD

BACKGROUND OF THE INVENTION

1. Field of the Invention

The present invention relates to a monitor system, a terminal unit, a monitor system control method, a terminal unit control method, a terminal unit control program, a computer-readable recording medium having the terminal unit control program, an administrative apparatus, an administrative apparatus control method, an administrative apparatus control program, and a computer-readable recording medium having the administrative apparatus control program.

2. Background Information

Conventionally, as a system for monitoring whether a mobile object such as an infant or aged person is within a predetermined area, there has been a system in which a permissible moving area in which such infant is allowed is recorded in advance in a computer, and the current position of the infant can be located by a SPS (Satellite Positioning System) receiver being carried by the infant to monitor whether or not the current position of the infant is within the permissible moving area. In such conventional monitor system, when the infant is outside the permissible moving area, a reporting signal is configured to be sent to the terminal of the person who is monitoring the infant.

However, in such system that detects the current position of the infant with a SPS receiver, there is generally an error between the current position as detected by the SPS receiver and the current position indicated as the positioning result at the monitoring terminal. For this reason, there could be a situation where the positioning result indicates the infant carrying a SPS receiver is outside the permissible moving area, when in fact the infant is within the permissible moving range.

In other words, an incorrect reporting signal that the infant is off the permissible moving area could be sent to the monitoring terminal.

In view of the above, it will be apparent to those skilled in the art from this disclosure that there exists a need for improved monitor systems, terminal units, mobile monitoring methods, terminal unit control methods, terminal unit control programs, computer-readable recording media having such terminal unit control program, administrative apparatuses, administrative apparatus control methods, administrative apparatus control programs, and computer-readable recording media having such administrative apparatus control program that overcome the problems of the conventional art. This invention addresses this need in the art as well as other needs, which will become apparent to those skilled in the art from this disclosure.

SUMMARY OF THE INVENTION

Therefore, it is an object of the present invention to provide a monitor system, a terminal unit, a mobile monitoring method, a terminal unit control method, a terminal unit control program, a computer-readable recording medium having the terminal unit control program, an administrative apparatus, an administrative apparatus control method, an administrative apparatus control program, a computer-readable recording medium having the administrative apparatus control program, which can reduce occurrences of incorrect reporting.

A monitor system according to the first aspect of the present invention is a monitor system configured to monitor a monitoring object with a position-related signal from a satellite positioning system. The monitor system includes a terminal unit adapted to be attached to the monitoring object, and a monitor apparatus configured to communicate with the terminal unit to monitor a position of the terminal unit. The terminal unit includes a terminal-end positioning portion, a terminal-end predetermined-zone information storing portion, a terminal-end positioning-interval information storing portion, a terminal-end first-located position information storing portion, a terminal-end second-located position information storing portion, a terminal-end inside/outside-of-predetermined-zone deciding information storing portion, a terminal-end third-located position information acquiring information storing portion, a terminal-end inside/outside-of-predetermined-zone confirming information storing portion, and a terminal-end report information storing portion. The terminal-end positioning portion is configured to receive a position-related signal from the position-information satellite and locate a position of the terminal unit. The terminal-end predetermined-zone information storing portion is configured to store predetermined zone information. The terminal-end positioning-interval information storing portion is configured to store positioning-interval information, which indicates a positioning time interval at which a position of the terminal unit is to be located. The terminal-end first-located position information storing portion is configured to store first-located position information. The terminal-end second-located position information storing portion is configured to store second-located position information. The second-located position information being obtained upon a lapse of the positioning time interval after the first-located position information is obtained. The terminal-end inside/outside-of-predetermined-zone deciding information storing portion is configured to store inside/outside-of-predetermined-zone deciding information for determining whether the first and second-located positions are within the predetermined zone. The terminal-end third-located position information acquiring information storing portion is configured to store third-located position information acquiring information, which is a condition for acquiring third-located position information. The third-located position information acquiring information is a condition that one of the first and second-located positions is within the predetermined zone and the other of the first and second-located positions is outside the predetermined zone. The third-located position information is acquired before a lapse of the positioning time interval after the second-located position is located if the condition of the third-located position information acquiring information is satisfied. The terminal-end inside/outside-of-predetermined-zone confirming information storing portion is configured to store inside/outside-of-predetermined-zone confirming information, which is a condition that one of the first and third-located positions is within the predetermined zone and the other of the first and third-located positions is outside the predetermined zone. The terminal-end report information storing portion is configured to store report information to be reported to the monitor apparatus if the condition of the inside/outside-of-predetermined-zone confirming information is satisfied.

According to the first aspect of the present invention, the terminal unit acquires the first-located position, and thereafter locates the current position upon a lapse of the positioning time interval, thereby acquiring the second-located position information that indicates a second-located position. When the condition that one of the first and second-located positions is within the predetermined zone and the other of the first and second-located positions is outside the predetermined zone is satisfied, the current position is located before a lapse of the positioning time interval, thereby acquiring the third-located position information that indicates a third-located position. Furthermore, when the condition that one of the first and third-located positions is within the predetermined zone and the other of the first and third-located positions is outside the predetermined zone is satisfied, a reporting signal is sent to the monitor apparatus.

Accordingly, a reporting signal is not sent to the monitor apparatus when it is determined that the first-located position is within the predetermined zone and the second-located position is outside the predetermined zone. This is because errors are potentially involved in the positioning by the terminal unit, and if a reporting signal is immediately sent when the second-located position is determined to be outside the predetermined zone, such reporting signal possibly results in an error.

In this respect, when the first-located position is within the predetermined zone and the second-located position is outside the predetermined zone, for example, the present invention further locates the current position to acquire the third-located position. When the third-located position is outside the predetermined zone similarly to the second-located position, then a reporting signal is sent to the monitor apparatus.

The reception sensitivity of the position information signal from the satellite positioning system is possibly different between time when the second-located position is located and the time when the third-located position is located. Accordingly, by acquiring the third-located position as well as the second-located position, it is possible to confirm more accurately that the terminal unit is outside the predetermined zone. As a result, incorrect reporting signals can be reduced.

Moreover, in this invention, where the condition that the first-located position is within the predetermined zone and the second-located position is outside the permitted predetermined zone is satisfied, for example, the current position is located without waiting for a lapse of the positioning time interval to acquire the third-located position information. Accordingly, where the terminal unit is determined to be positioned outside the predetermined zone, the third-located position can be immediately acquired before a lapse of the positioning time interval of, for example, 3 minutes, making it possible to quickly confirm whether or not the terminal unit is really outside the predetermined zone.

A monitor system according to the second aspect of the present invention is the monitor system of the first aspect of the present invention, in which the terminal-end third-located position information acquiring information is a condition that the first-located position is within the predetermined zone and the second-located position is outside the predetermined zone, and the terminal-end inside/outside-of-predetermined-zone confirming information is a condition that the first-located position is within the predetermined zone and the third-located position is outside the predetermined zone.

According to the second aspect of the present invention, when the monitoring object moves from inside the predetermined zone to outside the predetermined zone, a reporting signal is sent from the terminal unit to the monitor apparatus.

A monitor system according to the third aspect of the present invention is the monitor system of the first aspect of the present invention, in which the predetermined zone is under control of an owner of the monitoring object.

Here, "under control of a person monitoring the predetermined zone" means an area where a person who monitors the area has actual control over the area by himself or through a third party. For instance, the zone under actual control is a home of the monitoring person or a parking space that he rents from someone else.

In the case that the monitoring person is parking his automobile in the parking lot that he rents, when the automobile is taken out of the parking lot by a person other than the monitoring person, the monitoring person needs to be notified of the incident by the terminal unit so that he can take necessary measures such as reporting to the police.

Meanwhile, as long as the automobile is within the parking lot, the monitoring person should avoid reporting to the police. In this manner, because it is necessary to obtain correct information as to whether the monitoring object is within or outside the parking lot, the arrangement of the present invention that obtains the third-located position for confirming the current position of the monitoring object is especially effective.

A monitor system according to the fourth aspect of the present invention is the monitor system of the first aspect of the present invention, in which the predetermined zone is situated indoors.

Because the position-related signal from the satellite positioning system generally has poor in reception sensitivity when it is received indoors, there is a greater positioning error in the positioning by the terminal unit, as compared to the case where such position-related signal is received outdoors. Thus, an incorrect determination as to whether the monitoring object is within or outside the predetermined zone is more likely to occur when the predetermined zone is, for instance, an indoor parking lot.

Thus, where positioning error is significant, the arrangement of the present invention that acquires the third-located position for confirming the current position of the monitoring object is especially effective.

A terminal unit according to the fifth aspect of the present invention is adapted to be attached to a monitoring object, which is adapted to be monitored by a monitor system with a position-related signal from a satellite positioning system. The terminal unit includes a terminal-end positioning portion, a terminal-end predetermined-zone information storing portion, a terminal-end first-located position information storing portion, a terminal-end second-located position information storing portion, a terminal-end inside/outside-of-predetermined-zone deciding information storing portion, a terminal-end third-located position information acquiring information storing portion, a terminal-end inside/outside-of-predetermined-zone confirming information storing portion, and a terminal-end report information storing portion. The terminal-end positioning portion is configured to receive a position-related signal from the satellite positioning system and locate a position of the terminal unit. The terminal-end predetermined-zone information storing portion is configured to store predetermined-zone information. The terminal-end positioning-interval information storing portion is configured to store positioning-interval information, which indicates a positioning time interval at which a position of the terminal unit is to be located. The terminal-end first-located position information storing portion is configured to store first-located position information. The terminal-end second-located position information storing portion is configured to store second-located position information. The second-located position information is obtained upon a lapse of the positioning time interval after the first-located position is located. The terminal-end inside/outside-of-predetermined-zone deciding information storing portion is configured to store inside/outside-of-predetermined-zone deciding information for determining whether the first and second-located positions are within the predetermined zone. The terminal-end third-located position information acquiring information storing portion is configured to store third-located position information acquiring information for acquiring third-located position information, which is a condition for acquiring third-located position information. The third-located position information acquiring information is a condition that one of the first and second-located positions is within the predetermined zone and the other of the first and second-located positions is outside the predetermined zone. The third-located position information is acquired before a lapse of the positioning time interval after the second-located position is located if the condition of the third-located position information acquiring information is satisfied. The terminal-end inside/outside-of-predetermined-zone confirming information storing portion is configured to store inside/outside-of-predetermined-zone confirming information, which is a condition that one of the first and third-located positions is within the predetermined zone and the other of the first and third-located positions is outside the predetermined zone. The terminal-end report information storing portion is configured to store report information to be reported to the monitor apparatus if the condition of the inside/outside-of-predetermined-zone confirming information is satisfied.

This aspect of the present invention reduces incorrect reporting while allowing reporting signals to be sent out quickly, as in the first aspect of the present invention.

The terminal unit of the sixth aspect of the present invention is the terminal unit of the fifth aspect of the present invention, in which the terminal-end third-located position information acquiring information is a condition that the first-located position is within the predetermined zone and the second-located position is outside the predetermined zone, and the terminal-end inside/outside-of-predetermined-zone confirming information is a condition that the first-located position is within the predetermined zone and the third-located position is outside the predetermined zone.

A monitor system control method of the seventh aspect of the present invention includes a first-located position information acquiring step for acquiring first-located position information, which indicates a first-located position of a terminal unit attached to a monitoring object, with a position-related signal received from a satellite positioning system; a second-located position information acquiring step for acquiring second-located position information, which indicates a second-located position of the terminal unit upon a lapse of a positioning time interval after the first-located position is acquired; an inside/outside-of-predetermined-zone deciding step for determining whether a condition that one of the first and second-located positions is within the predetermined zone and the other of the first and second-located positions is outside the predetermined zone is satisfied; a third-located position information acquiring step for acquiring third-located position information, which indicates a third-located position of the terminal unit, before a lapse of the positioning time interval if one of the first and second-located positions is within the predetermined zone and the other of the first and second-located positions is outside the predetermined zone; an inside/outside-of-predetermined-zone confirming step for determining whether a condition that one of the first and third-located positions is within the predetermined zone and the other of the first and third-located positions is outside the predetermined zone; and a reporting step for making a report to a monitor apparatus that is monitoring a position of the terminal unit if one of the first and third-located positions is within the predetermined zone and the other of the first and third-located positions is outside the predetermined zone.

This aspect of the present invention reduces incorrect reporting while allowing reporting signals to be sent out quickly, as in the first aspect of the present invention.

The monitor system control method according to the eighth aspect of the present invention is the monitor system control method of the seventh aspect of the present invention, in which in the third-located position information acquiring step, the third-located position information is acquired if the first-located position is within the predetermined zone and the second-located position is outside the predetermined zone, and in the reporting step, a report is made to the monitor apparatus if the first-located position is within the predetermined zone and the third-located position is outside the predetermined zone.

The monitor system control method according to the ninth aspect of the present invention is the monitor system control method of the seventh aspect of the present invention, in which the first-located position information acquiring step, the second-located position information acquiring step, the inside/outside-of-predetermined-zone deciding step, the third-located position information acquiring step, the inside/outside-of-predetermined-zone confirming step, and the reporting step are performed by the terminal unit.

The monitor system control method according to the tenth aspect of the present invention is the monitor system control method of the seventh aspect of the present invention, in which the first, second, and third-located position information acquiring steps are performed by an administrative apparatus by receiving the position-related signal that the terminal unit received from the satellite positioning system, the administrative apparatus being configured to locate a position of the terminal unit, and the inside/outside-of-predetermined-zone deciding step, the inside/outside-of-predetermined-zone confirming step, and the reporting step are performed by the administrative apparatus.

A monitor system of the fourteenth aspect of the present invention is configured to monitor a monitoring object with a position-related signal from a satellite positioning system. The monitor system includes a terminal unit adapted to be attached to the monitoring object, a monitor apparatus configured to communicate with the terminal unit to monitor a position of the terminal unit, and an administrative apparatus configured to communicate with the terminal unit and the monitor apparatus and to locate a position of the terminal unit. The terminal unit includes a position-related signal receiving portion configured to receive a position-related signal from the position-information satellite. The administrative apparatus includes an administrative-end predetermined-zone information storing portion, an administrative-end positioning portion, an administrative-end positioning-interval information storing portion, an administrative-end first-located position information storing portion, an administrative-end second-located position information storing portion, an administrative-end inside/outside-of-predetermined-zone deciding information storing portion, an administrative-end third-located position information acquiring information storing portion, an administrative-end inside/outside-of-predetermined-zone confirming information storing portion, and an administrative-end report information storing portion. The administrative-end predetermined-zone information storing portion is configured to store predetermined-zone information of the monitoring object. The administrative-end positioning portion is configured to locate a position of the terminal unit based on the position-related signal sent from the terminal unit. The administrative-end positioning-interval information storing portion is configured to store positioning-interval information, which indicates a positioning time interval at which a position of the terminal unit is to be located. The administrative-end first-located position information storing portion is configured to store first-located position information. The administrative-end second-located position information storing portion is configured to store second-located position information. The second-located position information is obtained upon a lapse of the positioning time interval after the first-located position is located. The administrative-end inside/outside-of-predetermined-zone deciding information storing portion is configured to store inside/outside-of-predetermined-zone deciding information for determining whether the first and second-located positions are within the predetermined zone. The administrative-end third-located position information acquiring information storing portion is configured to store third-located position information acquiring information for acquiring third-located position information, which is a condition for acquiring third-located position information. The third-located position information acquiring information is a condition that one of the first and second-located positions is within the predetermined zone and the other of the first and second-located positions is outside the predetermined zone. The third-located position information is acquired, by receiving the position-related signal from the terminal unit, before a lapse of the positioning time interval after the second-located position information is acquired if the condition of the third-located position information acquiring information is satisfied. The administrative-end inside/outside-of-predetermined-zone confirming information storing portion is configured to store inside/outside-of-predetermined-zone confirming information, which is a condition that one of the first and third-located positions is within the predetermined zone and the other of the first and third-located positions is outside the predetermined zone. The administrative-end report information storing portion is configured to store report information to be reported to the monitor apparatus if the condition of the inside/outside-of-predetermined-zone confirming information is satisfied.

The monitor system according to the fifteenth aspect of the present invention is the monitor system of the fourteenth aspect of the present invention, in which the administrative-end third-located position information acquiring information is a condition that the first-located position is within the predetermined zone and the second-located position is outside the predetermined zone, and the administrative-end inside/outside-of-predetermined-zone confirming information is a condition that the first-located position is within the predetermined zone and the third-located position is outside the predetermined zone.

An administrative apparatus according to the sixteenth aspect of the present invention is configured to communicate with a terminal unit that is attached to a monitoring object and with a monitor apparatus that is configured to monitor a position of the terminal unit with a position-related signal from a satellite positioning system. The administrative apparatus includes an administrative-end predetermined-zone information storing portion, an administrative-end positioning portion, an administrative-end positioning-interval information storing portion, an administrative-end first-located position information storing portion, an administrative-end second-located position information storing portion, an administrative-end inside/outside-of-predetermined-zone deciding information storing portion, an administrative-end third-located position information acquiring information storing portion, an administrative-end inside/outside-of-predetermined-zone confirming information storing portion, and an administrative-end report information storing portion. The administrative-end predetermined-zone information storing portion is configured to store predetermined-zone information of the monitoring object. The administrative-end positioning portion is configured to locate a position of the terminal unit based the position-related signal sent from the terminal unit. The administrative-end positioning-interval information storing portion is configured to store positioning-interval information, which indicates a positioning time interval at which a position of the terminal unit is to be located. The administrative-end first-located position information storing portion is configured to store first-located position information. The administrative-end second-located position information storing portion is configured to store second-located position information. The second-located position information is obtained upon a lapse of the positioning time interval after the first-located position is located. The administrative-end inside/outside-of-predetermined-zone deciding information storing portion is configured to store inside/outside-of-predetermined-zone deciding information for determining whether the first and second-located positions are within the predetermined zone. The administrative-end third-located position information acquiring information storing portion is configured to store the third-located position information acquiring information for acquiring third-located position information. The third-located position information acquiring information is a condition that one of the first and second-located positions is within the predetermined zone and the other of the first and second-located positions is outside the predetermined zone. The third-located position information is acquired, by receiving the position-related signal from the terminal unit, before a lapse of the positioning time interval after the second-located position information is acquired if the condition of the third-located position information acquiring information is satisfied. The administrative-end inside/outside-of-predetermined-zone confirming information storing portion is configured to store inside/outside-of-predetermined-zone confirming information, which is a condition that one of the first and third-located positions is within the predetermined zone and the other of the first and third-located positions is outside the predetermined zone. The administrative-end report information storing portion is configured to store report information to be reported to the monitor apparatus if the condition of the inside/outside-of-predetermined-zone confirming information is satisfied.

The administrative apparatus according to the seventeenth aspect of the present invention is the administrative apparatus of the sixteenth aspect of the present invention, in which the administrative-end third-located position information acquiring information is a condition that the first-located position is within the predetermined zone and the second-located position is outside the predetermined zone, and the administrative-end inside/outside-of-predetermined-zone confirming information is a condition that the first-located position is within the predetermined zone and the third-located position is outside the predetermined zone.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Embodiments of the present invention will now be explained in detail with reference to the drawings.

First Embodiment

Figure 1:
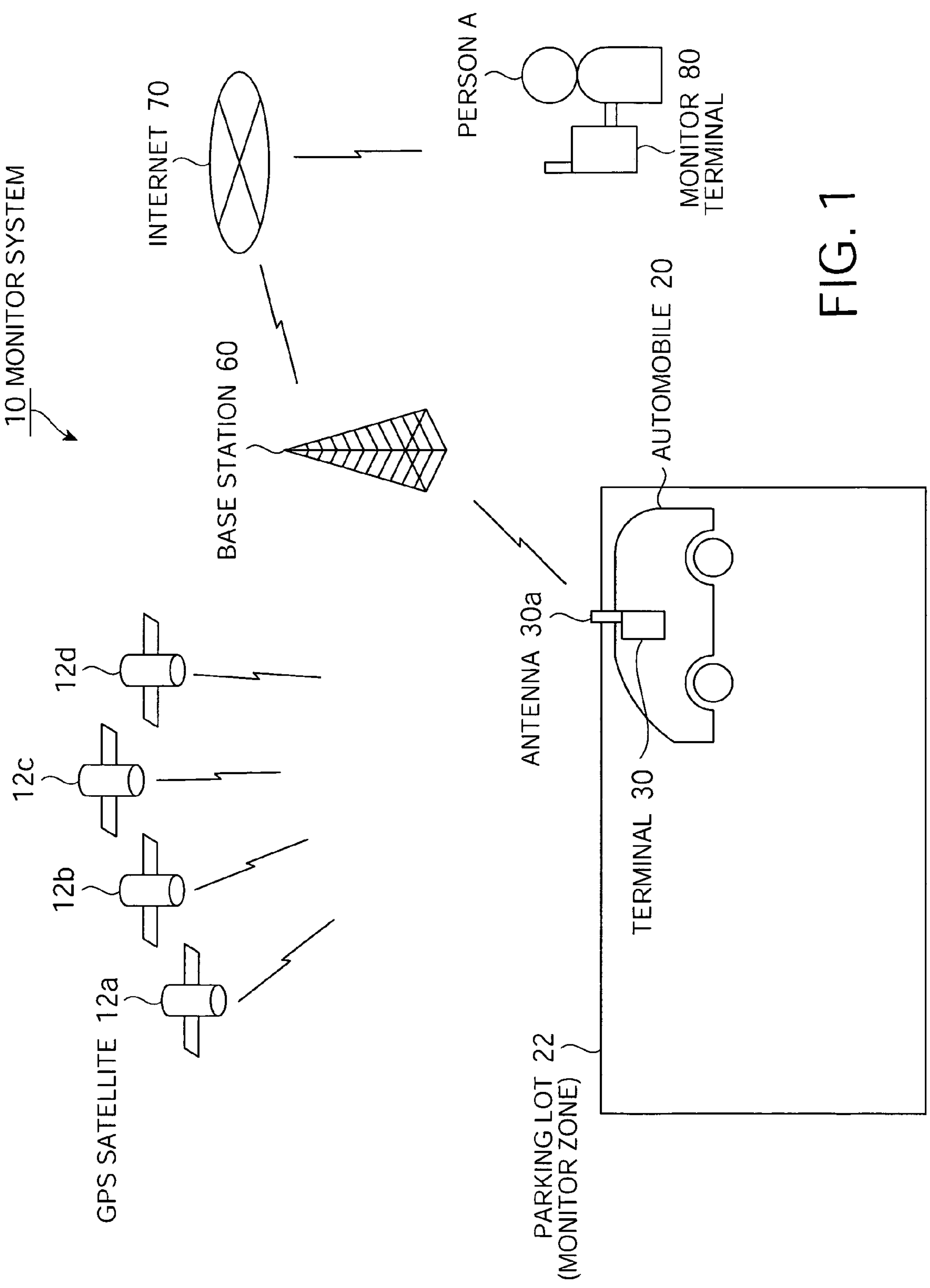
FIG. 1 is a schematic view showing a monitor system according to a first embodiment of the present invention.

FIG. 1 is a schematic diagram showing a monitor system 10 according to a first embodiment of the invention.

As shown in FIG. 1, a monitor system 10 includes a terminal 30, which is an example of the terminal unit. The terminal 30 includes a GPS device, which is an example of the terminal-end positioning portion and will be described below. The GPS device locates the current position of the movable object by receiving a position-related signal from GPS (Global Positioning System) satellites 12*a*, 12*b*, 12*c*, 12*d*, which is an example of the Satellite Positioning System (SPS).

In this embodiment, the terminal 30 is arranged on an automobile 20, which is the monitoring object. The terminal 30 has an antenna 30*a*, and is configured to communicate with a monitor terminal 80, which is an example of the monitor apparatus and is carried by a person A, for monitoring the position of the terminal 30 through a base station 60 and the Internet 70, which is an example of the communication network.

The automobile 20 is parked in a parking lot 22. The parking lot 22 is permissible moving area, which is an example of the predetermined zone, as well as an example of the area-under control of the person A.

The monitor system 10 is a system that allows the owner A of automobile 20 to set the parking lot 22 as a predetermined zone, such that the automobile 20 will not be taken away by someone other than the owner A from the parking lot 22.

In this embodiment, the terminal 30 is a car navigation apparatus, a cellular phone, a PHS (Personal Handy-phone System), a PDA (Personal Digital Assistant) or any other terminal. The terminal unit of the present invention is not limited to the examples listed above.

Although there are four GPS satellites 12*a*-12*d* in the present embodiment, the monitor system of the present invention is not limited to such configuration. The monitor system 10 of the present invention can have five or more or any number of satellites in the satellite positioning system.

Major Hardware Arrangement of Base Station 60

Figure 2:
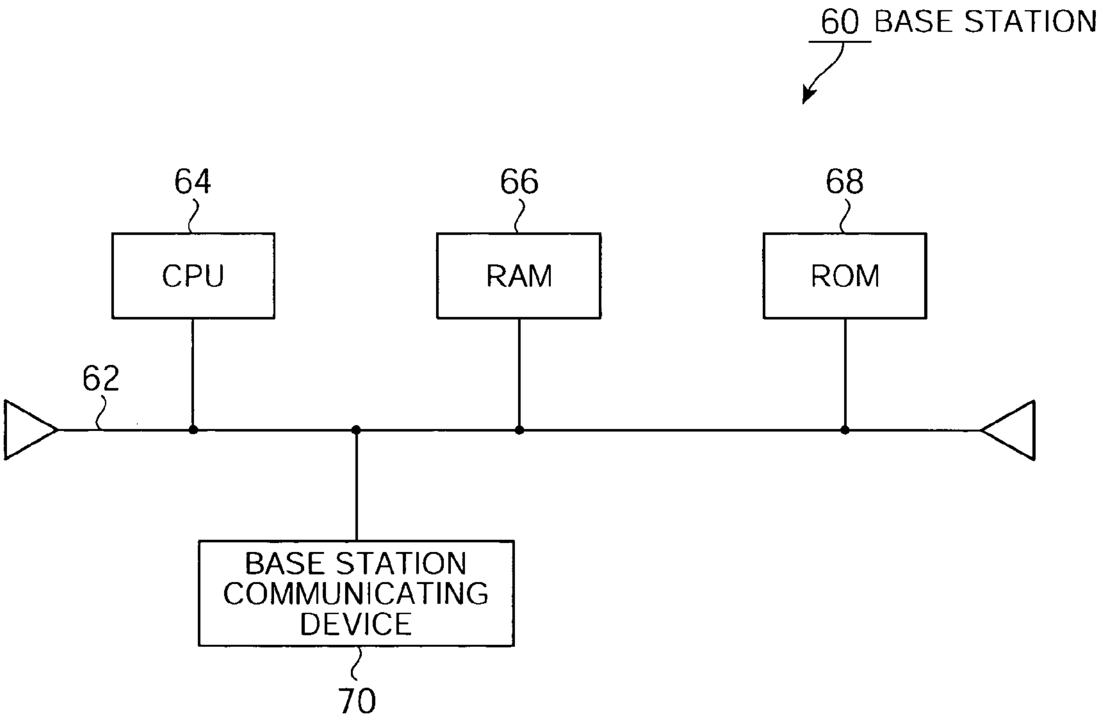
FIG. 2 is a schematic diagram showing a major hardware arrangement of a base station according to the first embodiment of the present invention.

FIG. 2 is a schematic diagram showing a major hardware arrangement of the base station 60.

The base station 60 has a computer, which has a bus 62, as shown in FIG. 2. To the bus 62 are connected a CPU (Central Processing Unit) 64, a RAM (Random Access Memory) 66, a ROM (Read Only Memory) 68 and other known components. The bus 62 is also connected with a base-station communicating device 70 for communication with the terminal 30 of FIG. 1.

Major Software Configuration of Base Station 60

Figure 3:
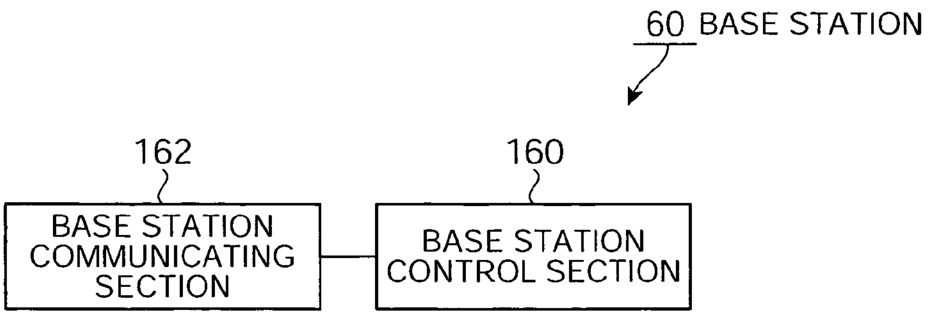
FIG. 3 is a schematic diagram showing a major software configuration of a base station according to the first embodiment of the present invention.

FIG. 3 is a schematic diagram showing a major software configuration of the base station 60.

As shown in FIG. 3, the base station 60 has a base-station communicating section 162, which corresponding to the base-station communicating device 70 shown in FIG. 2, and a base-station control section 160, which controls other components of the base station 60.

Major Hardware Arrangement of Monitor Terminal 80

Figure 4:
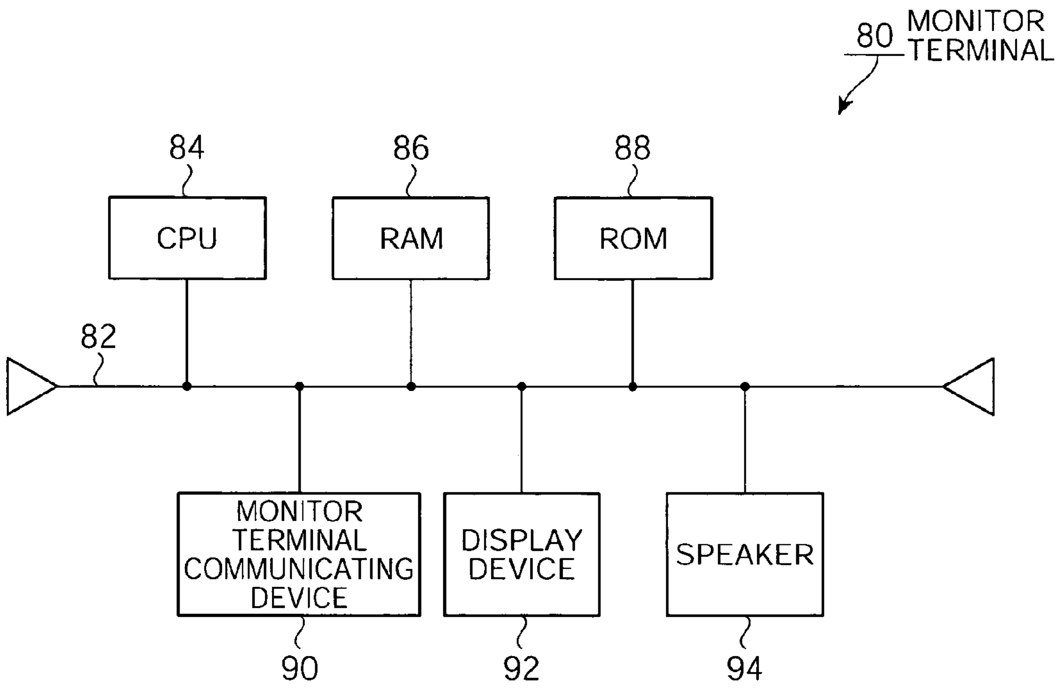
FIG. 4 is a schematic diagram showing a major hardware arrangement of a monitor terminal according to the first embodiment of the present invention.

FIG. 4 is a schematic diagram showing a major hardware arrangement of the monitor terminal 80.

The monitor terminal 80 has a computer, which has a bus 82, as shown in FIG. 4. To the bus 82 are connected a CPU 84, a RAM 86, a ROM 88 and other known components. The bus 82 is also connected with a monitor-terminal communicating device 90, which communicates with the terminal 30 shown in FIG. 1 through the base station 60 and the Internet 70.

Furthermore, the bus 82 is also connected with a display device 92 for displaying various information, and a speaker 94 for outputting various sorts of sounds.

Major Software Configuration of Monitor Terminal 80

Figure 5:
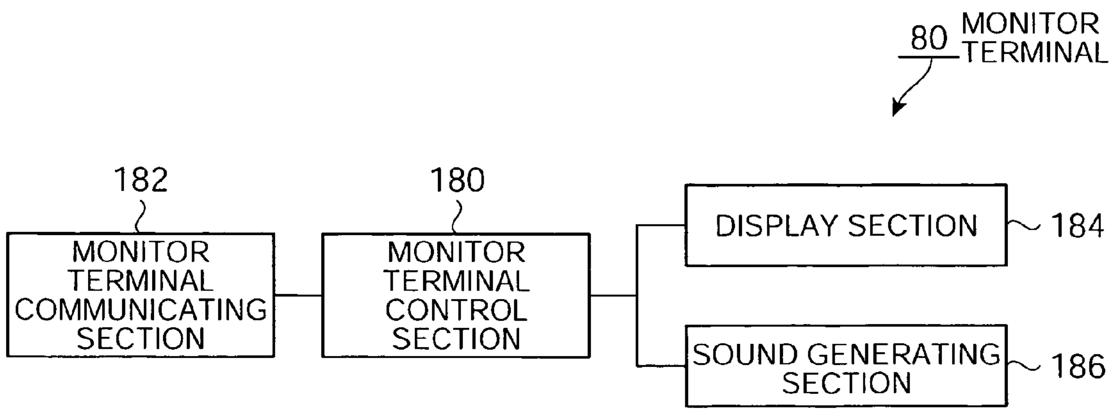
FIG. 5 is a schematic diagram showing a major software configuration of a monitor terminal according to the first embodiment of the present invention.

FIG. 5 is a schematic diagram showing a major software configuration of the monitor terminal 80.

As shown in FIG. 5, the monitor terminal 80 has a monitor-terminal communicating section 182 which corresponds to the monitor-terminal communicating device 90 shown in FIG. 4, a display device 184 which corresponds to the display device 92 shown in FIG. 4, a sound generating section 186 which corresponds to the speaker 94 shown in FIG. 4, and a monitor-terminal control section 180 which controls other components of the monitor terminal 80.

Major Hardware Arrangement of Terminal 30

Figure 6:
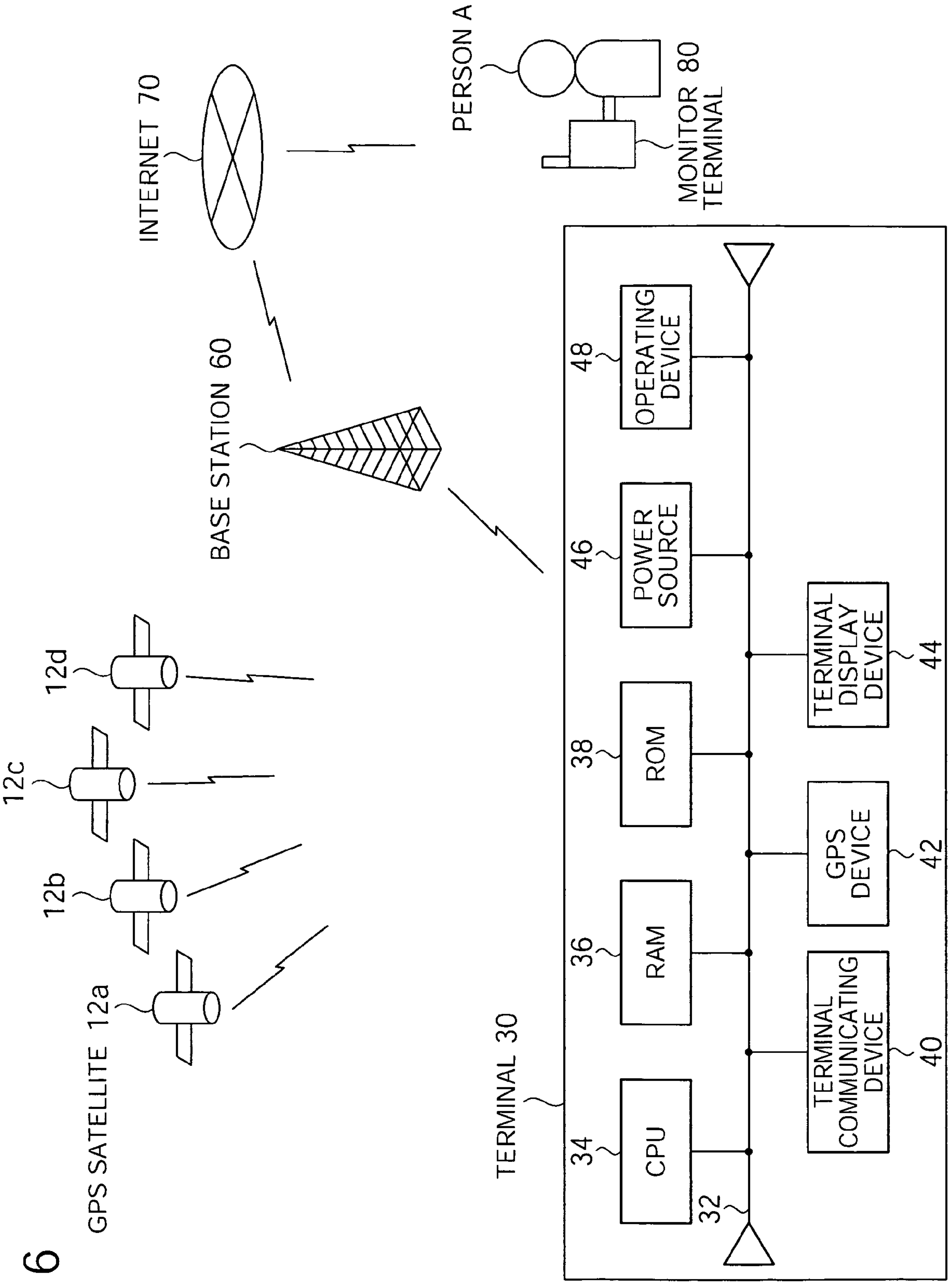
FIG. 6 is a schematic diagram showing a major hardware arrangement of a terminal according to the first embodiment of the present invention.

FIG. 6 is a schematic diagram showing a major hardware arrangement of the terminal 30.

The terminal 30 has a computer, which has a bus 32, as shown in FIG. 6. The bus 32 is connected with a CPU 34, a RAM 36, a ROM 38 and other known components.

The bus 32 is also connected with a terminal communicating device 40 and a GPS device 42. The terminal communicating device 40 communicates with the monitor terminal 80 carried by the person A, via the base station 60 and Internet 70 as shown in FIG. 1. The GPS device 42 is an example of the terminal-end positioning portion. The GPS device 42 receives a position-related signal from the GPS satellites 12*a*-12*d* and locates its current position.

The bus 32 is also connected with a terminal display device 44, which displays various information, a power source 46, and an operation device 48, which allows the person A shown in FIG. 1 to operate the terminal 30.

Major Software Configuration of Terminal 30

Figure 7:
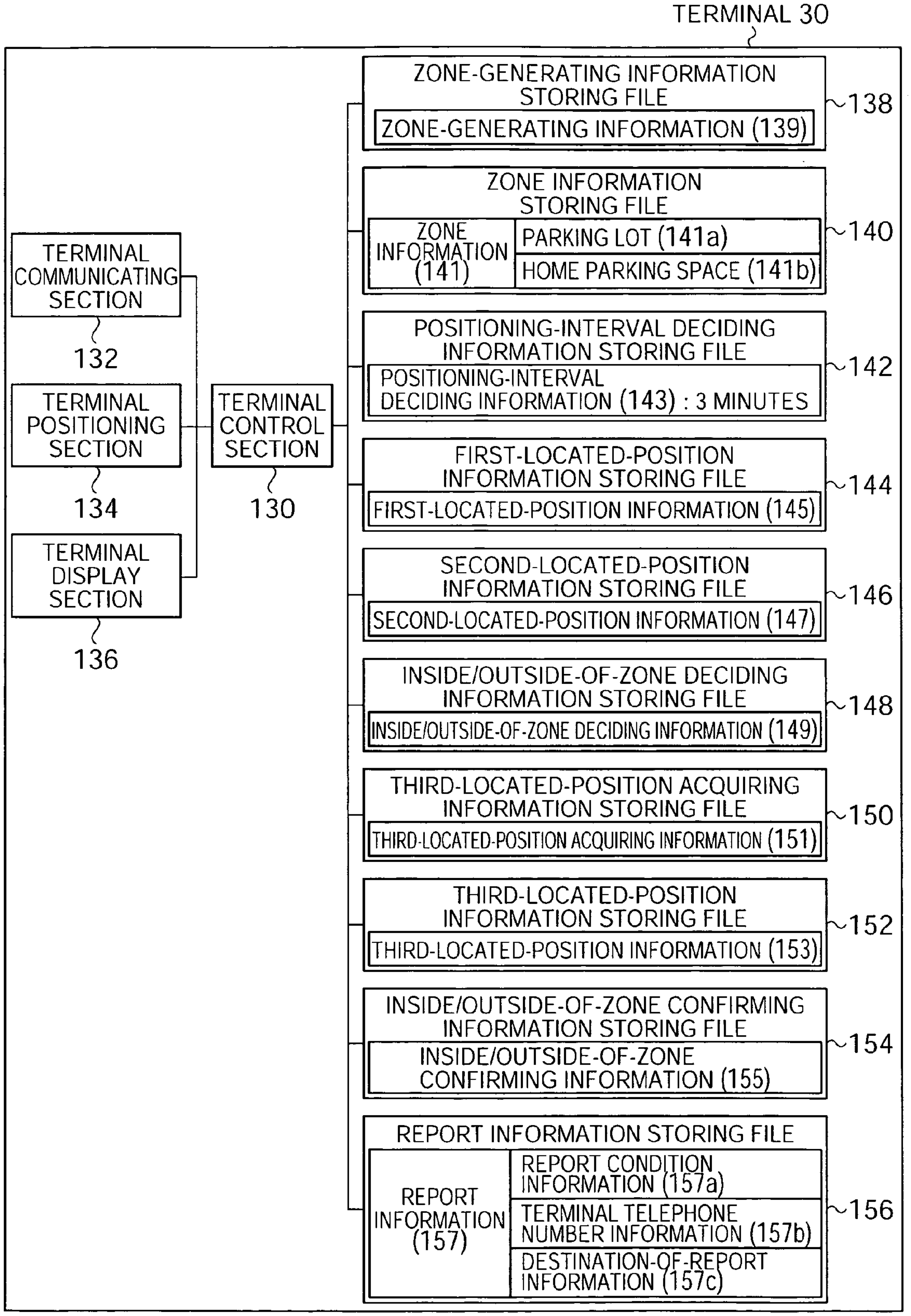
FIG. 7 is a schematic diagram showing a major software configuration of a terminal according to the first embodiment of the present invention.

FIG. 7 is a schematic diagram showing a major software configuration of the terminal 30.

As shown in FIG. 7, the terminal 30 has a terminal communicating section 132 which corresponds to the terminal communicating device 40 shown in FIG. 6, a terminal positioning section 134 which corresponds to the GPS device 42 shown in FIG. 6, and a terminal display section 136 which corresponds to the terminal display device 44 shown in FIG. 6.

The terminal 30 also has a terminal control section 130 which controls other components of the terminal 30. More specifically, as the files that are controlled by the terminal control section 130, the terminal 30 has a zone-generating information storing file 138, a zone-generating information storing file 140, a positioning-interval deciding information storing file 142, a first-located position information storing file 144, a second-located position information storing file 146, an inside-outside-of-zone deciding information storing file 148, a third-located position acquiring information storing file 150, a third-located position information storing file 152, an inside/outside-of-zone confirming information storing file 154, and a report information storing file 156.

Zone-Generating-Information Storing File 138

The zone-generating-information storing file 138 stores zone-generating information 139, based on which the terminal control section 130 generates permissible moving zone information.

Zone-Information Storing File 140

The terminal control section 130 stores zone information 141 generated based upon the zone-generating information, to the zone-information storing file 140. The zone-information storing file 140, which is an example of the terminal-end permissible moving zone information storing portion, stores zone information 141. The zone information 141 is the permissible moving zone, and indicates the zone in which the automobile 20 is allowed. In this embodiment, the terminal control section 130 is capable of generating the zone information 141 as the permissible moving zone information, which in this embodiment is a rectangular area, based on the zone-generating information 139 stored in the zone-generating-information storing file 138.

Although the zone information 141 is a rectangular area in this embodiment, the present invention is not limited to such construction. The zone information can be, for example, a circular region that is centered on a particular geographic point, or any geographic shape.

The zone-information storing file 140 is capable of storing a plurality of items as the zone information 141. More specifically, the terminal 30 can generate, according to an instruction by the person A shown in FIG. 1, zone information 141*a* corresponding to the parking lot 22, as well as zone information 141*b* corresponding to the person A's home parking space. The terminal 30 is configured to decide, according to the instruction by the person A shown in FIG. 1, against which of the zone information 141*a* and the zone information 141*b* the monitoring is to be performed.

Positioning-Interval-Deciding-Information Storing File 142

The positioning-interval-deciding-information storing file 142 is an example of the terminal-end positioning-interval-information storing portion, and stores positioning interval information 143. The positioning interval information 143 indicates a time interval at which the current position of the monitoring object is to be located. In this embodiment, the positioning interval information 143 is, for example, 3 minutes.

The terminal control section 130 activates the GPS device 42 shown in FIG. 6 through the terminal positioning section 134, at a time interval of the positioning interval information 143, which is 3 minutes. After completion of the positioning by the terminal positioning section 134, the GPS device 42 is deactivated through the terminal positioning section 134.

First-Located Position Information Storing File 144

The first-located position-information storing file 144 is an example of the terminal-end first-located position information storing portion, and stores first-located position information 145 that is acquired by the terminal positioning section 134. The first-located position information 145 in this embodiment is position information that is acquired first in the chronological order by the terminal positioning section 134 at the parking lot 22 shown in FIG. 1.

Figure 8:
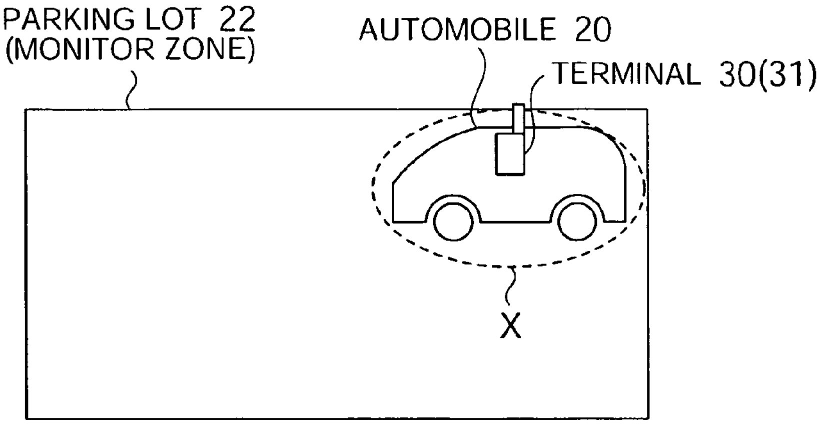
FIGS. 8(*a*) and 8(*b*) are schematic figures showing a parking lot.
Figure 8:
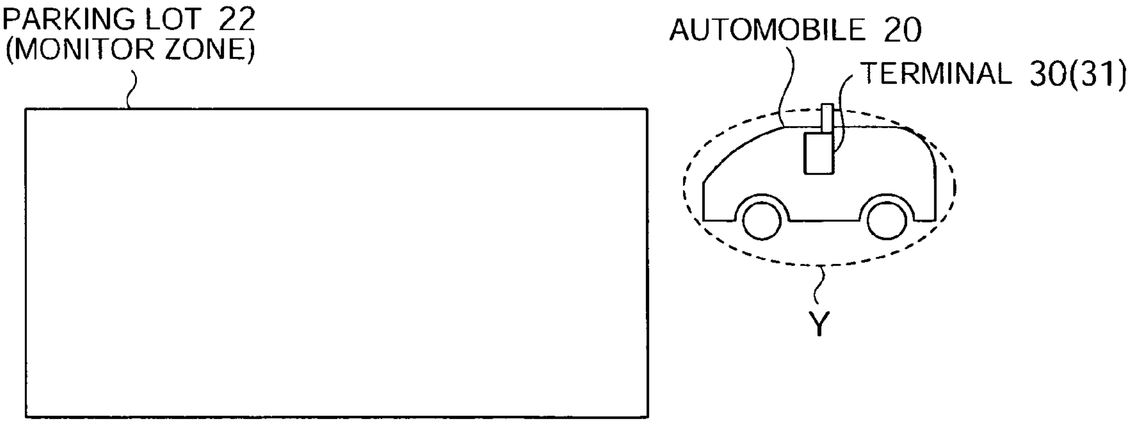

FIG. 8 is a schematic diagram showing the parking lot 22. In FIG. 8(*a*), the automobile 20 is at a geographical point X, which is within the parking lot 22. The terminal control section 130 acquires the position information of the geographical point X as the first-located position information 145, from the terminal positioning section 134. As seen in FIG. 8(*a*), the first-located position information indicates that a position of the automobile 20 is within the parking lot 22, which is the permissible moving zone.

When no position information has been acquired in the parking lot 22, a temporary (dummy) position information such as longitude 130° 25' 05.2" E and latitude 33° 36' 23.2"

N is stored as the first-located position information 145 in the first-located position storing file 144.

Second-Located Position Information Storing File 146

The second-located position information storing file 146 is an example of the terminal-end second-located position information storing portion, and stores second-located position information 147. The second-located position information 147 indicates the position information that is acquired by locating the current position upon a lapse of the positioning time interval of the positioning interval deciding information 143, which is 3 minutes, after acquiring the first-located position 145.

As shown in FIG. 8(*b*), upon a lapse of 3 minutes, which is the time indicated by the positioning interval deciding information 143, after the first-located position 145 is acquired, the automobile 20 is taken away by someone other than the person A and placed at a geographical point Y, which is outside the parking lot 22.

The terminal control section 130 acquires position information of the point Y as the second-located position information 147, through the terminal positioning section 134. As seen in FIG. 8(*b*), the second-located position information indicates that a position of the automobile 20 is outside the parking lot 22, which is the permissible moving zone.

Inside/Outside-of-Zone Deciding Information Storing File 148

The inside/outside-of-zone deciding information storing file 148 is an example of the terminal-end inside/outside-of predetermined zone deciding information storing portion, and stores inside/outside-of permissible moving zone deciding information 149. The inside/outside-of predetermined zone deciding information 149 allows the terminal control section 130 to determine whether or not the first-located position is within the permissible moving zone, as well as whether the second-located position is outside the permissible moving zone.

The terminal control section 130, when the first-located position is not a dummy position, decides whether or not the first-located position is within the parking lot 22, or the predetermined zone, based on the inside/outside-of-zone deciding information 149 stored in the inside/outside-of-zone deciding information storing file 148. As shown in FIG. 8(*a*), because the first-located position information 145 indicates the position X, which is within the parking lot 22, the terminal control section 130 decides that the first-located position 145 is within the permissible moving zone.

Meanwhile, the terminal control section 130 decides whether or not the second-located position 147 is within the parking lot 22, which is indicated by the zone information 141*a*. As shown in FIG. 8(*b*), because the second-located position information 147 indicates the position Y, which is outside the parking lot 22, the terminal control section 130 decides that the second-located position 147 is outside the permissible moving zone.

Here, the terminal control section 130 does not send a reporting signal to the monitor terminal 80 shown in FIG. 1 in a situation where the first-located position 145 is within the permissible moving zone and the second-located position is outside the permissible moving zone. This is because of potential errors in locating a position of the movable object by the GPS device 42. In other words, even though the second-located position 147 indicates a position that is outside the permissible moving zone, it does not necessarily mean that the movable object is in fact outside the permissible moving zone. Thus, if a reporting signal is sent out immediately after the second-located position 147 is acquired, such reporting signal could turn out to be an incorrect one. For this reason, the terminal control section 130 acquires third-located position information 151 in order to confirm the current position of the movable object.

Third-Located Position-Information Acquiring Information Storing File 150

The third-located position-information acquiring information storing file 150 shown in FIG. 7 is an example of the terminal-end third-located position-information acquiring information storing portion, and stores third-located position information acquiring information 151. The third-located position acquiring information 151 indicates a condition that should be satisfied before third-located position information 153 is acquired.

In other words, unlike the first-located position information 145 and the second-located position information 147, the terminal 30 acquires third-located position information 151 only when the first-located position information 145 and the second-located position information 147 satisfy a given condition. The third-located position-information acquiring information 151 indicates a condition for acquiring the third-located position information 153, which is that the first-located position information 145 indicates a position within the permissible moving zone, and the second-located position information 147 outside the permissible moving zone. When the condition of the third-located position-information acquiring information 151 is satisfied, the third-located position information 153 is acquired by locating the current position of the movable object without waiting for a lapse of the positioning time interval of 3 minutes.

Specifically, the terminal control section 130 of the terminal 30 activates the GPS device 42 shown in FIG. 6 through the terminal positioning section 134 within 1.5 seconds after it is determined that the first-located position information 145 and the second-located position information 147 satisfy the condition of the third-located position-information acquiring information 151 stored in the third-located position-information acquiring information storing file 150, without waiting for a lapse of the positioning time interval of 3 minutes indicated by the positioning interval deciding information 143.

Third-Located Position Information Storing File 152

The terminal control section 130 stores the obtained third-located position information 153 to the third-located position-information storing file 152.

In this example, the automobile 20 is at the position Y (see FIG. 8(*b*)), which is outside the parking lot 22 or the permissible moving zone, at the time the third-located position information 153 is to be acquired. Thus, the terminal control section 130 acquires the position information indicating the position Y through the terminal positioning section 134 as the third-located position information 153. Therefore, the third-located position information 153 indicates a position outside the parking lot 22, which is the permissible moving zone.

Inside/Outside-of-Zone Confirming Information Storing File 154

The inside/outside-of-zone confirming information storing file 154 is an example of the terminal-end inside/outside-of-permitted-movable-range confirming information storing portion, and stores inside/outside-of-permitted-movable-range confirming information 155. The inside/outside-of-permitted-movable-range confirming information 155 is information for deciding whether or not the first-located position 145 is within the permissible moving zone and the third-located position 153 is outside the permissible moving zone.

In this example, because the first-located position 145 is within the parking lot 22, or the permissible moving zone, (see FIG. 8(*a*)) while the third-located position 153 is outside the parking lot 22 (see FIG. 8(*b*)), the terminal 30 decides that the condition of the inside/outside-of-permitted-movable-range confirming information 155 is satisfied.

Report Information Storing File 156

The report information storing file 156 is an example of the terminal-end report information storing portion, and stores report information 157. The report information 157 is used in sending a reporting signal to the monitor terminal 80 shown in FIG. 1 in case the condition of the inside/outside-of-permitted-movable-range confirming information 155, which is that the first-located position is within the permissible moving zone and the third-located position is outside the permissible moving zone, is satisfied.

As shown in FIG. 7, the report information 157 includes report-condition information 157*a*, terminal telephone number information 157*b*, and destination-of-report information 157*c*. The report-condition information 157*a* indicates that a reporting signal should be sent to the monitor terminal 80 shown in FIG. 1 when the first-located position 145 is within the permissible moving zone, and the third-located position 153 is outside the permissible moving zone.

The terminal telephone-number information 157*b* is, for example, a telephone number of the terminal 30 for identifying the terminal 30. This allows the monitor terminal 80 to identify the terminal 30 that is mounted on the automobile 20 as shown in FIG. 1. In this manner, the person A shown in FIG. 1 can monitor the automobile 20.

The destination-of-report information 157*c* indicates a destination to which the terminal 30 sends a reporting signal that the movable object is outside the permissible moving zone. The destination-of-report information 157*c* is, for example, a telephone number of the monitor terminal 80 shown in FIG. 1. This enables the terminal 30 to make a report signal to the monitor terminal 80 through the base station and the Internet 70 as shown in FIG. 1.

In other words, when the first-located position 145 is within the permissible moving zone and the second-located position 147 is outside the permissible moving zone, the terminal 30 further locates the current position of the mobile object and acquires the third-located position 153. Thus, when the third-located position 153 is outside the monitor zone like the second-located position 147, a reporting signal is sent to the monitor terminal 80.

The positioning information obtained at the time the second-located position information 147 can be different from the positioning information obtained at the time the third-located position information 153 is obtained due to a change in the reception conditions of the GPS satellites 12*a*-12*d* shown in FIG. 1. Therefore, by obtaining the third-located position information 153 as well as the second-located position information 147, it is possible to confirm that the terminal 30 is in a position outside the permissible moving zone. In this manner, an erroneous reporting can be prevented.

Meanwhile, when the first-located position 145 is within the permissible moving zone and the second-located position 147 is outside the permissible moving zone, the third-located position information 153 is located without waiting for a lapse of the positioning time interval. Accordingly, when the terminal 30 is determined to be outside the permissible moving zone based on the second-located position 147, the third-located position 153 is immediately acquired without waiting for a lapse of 3 minutes of the positioning-interval deciding information 143. This makes it possible to confirm whether or not the current position of the movable object is outside the permissible moving zone right away.

Meanwhile, the condition set in the third-located position-information acquiring information 151, which is that the first-located position 145 is within the permissible moving zone and the second-located position 147 is outside the permissible moving zone, is not satisfied, the positioning information is not obtained until a second-located position is obtained upon a lapse of 3 minutes indicated by the positioning-interval deciding information 143. Thus, it is possible to prevent incorrect reporting signals while expediting the sending of a report signal without increasing the operation time of the GPS device 42 (see FIG. 6), which is high in power consumption.

The present embodiment of the present invention is especially effective where the permissible moving zone, which in this case is the parking lot 22 (FIG. 1), is a site under control of the person A. Here, the control means that the person A can exercise actual control over the site, whether by himself or through someone else. Such site-under-control is, for example, the person A's own home, or a parking lot that the person A is renting.

Where the person A parks his/her automobile 20 in the parking lot 22 under contract as noted above, if someone other than the person A takes the automobile 20 away from the parking lot 22, the person A needs to receive a report from the terminal 30 that is arranged on the automobile 20 so that he can take necessary measures, such as reporting to the police. On the contrary, if the automobile 20 is within the parking lot 22, the person A should not report to the police of a stolen automobile.

In this manner, there is a need for correct determination as to whether the automobile 20 is within the site-under-control. Thus, the present invention is particularly effective in that a third-located position is acquired to confirm the current position of the movable object.

Furthermore, the present embodiment is also fully effective where the parking lot 22, or the permissible moving zone, is situated indoors.

Since the reception sensitivity of position-related information from the GPS satellites 12*a* shown in FIG. 1 is generally not good indoors, errors in positioning information from the GPS device 42 shown in FIG. 6 tend to be greater indoors than outdoors. For this reason, for the indoor parking lot 22, there is a greater possibility for errors in determining whether the automobile 20 is within or outside the parking lot 22. Thus, the present embodiment of the present invention, which obtains the third-located position information for confirming the current position of the movable object, is fully effective in cases where possibility of positioning error is greater.

Although the present embodiment monitors the movable object moving out of a predetermine zone, the present invention is not limited to such construction. The present invention may also be constructed so as to monitor the movable object moving into a predetermined area. Furthermore, the present invention may be constructed so as to monitor the movable object moving both into and out of a predetermined area.

Operation of Monitor System 10

So far described is the arrangement of the monitor system 10 in accordance with the present embodiment. The operation of the monitor system 10 will now be explained referring to FIGS. 9 and 10.

Figure 9:
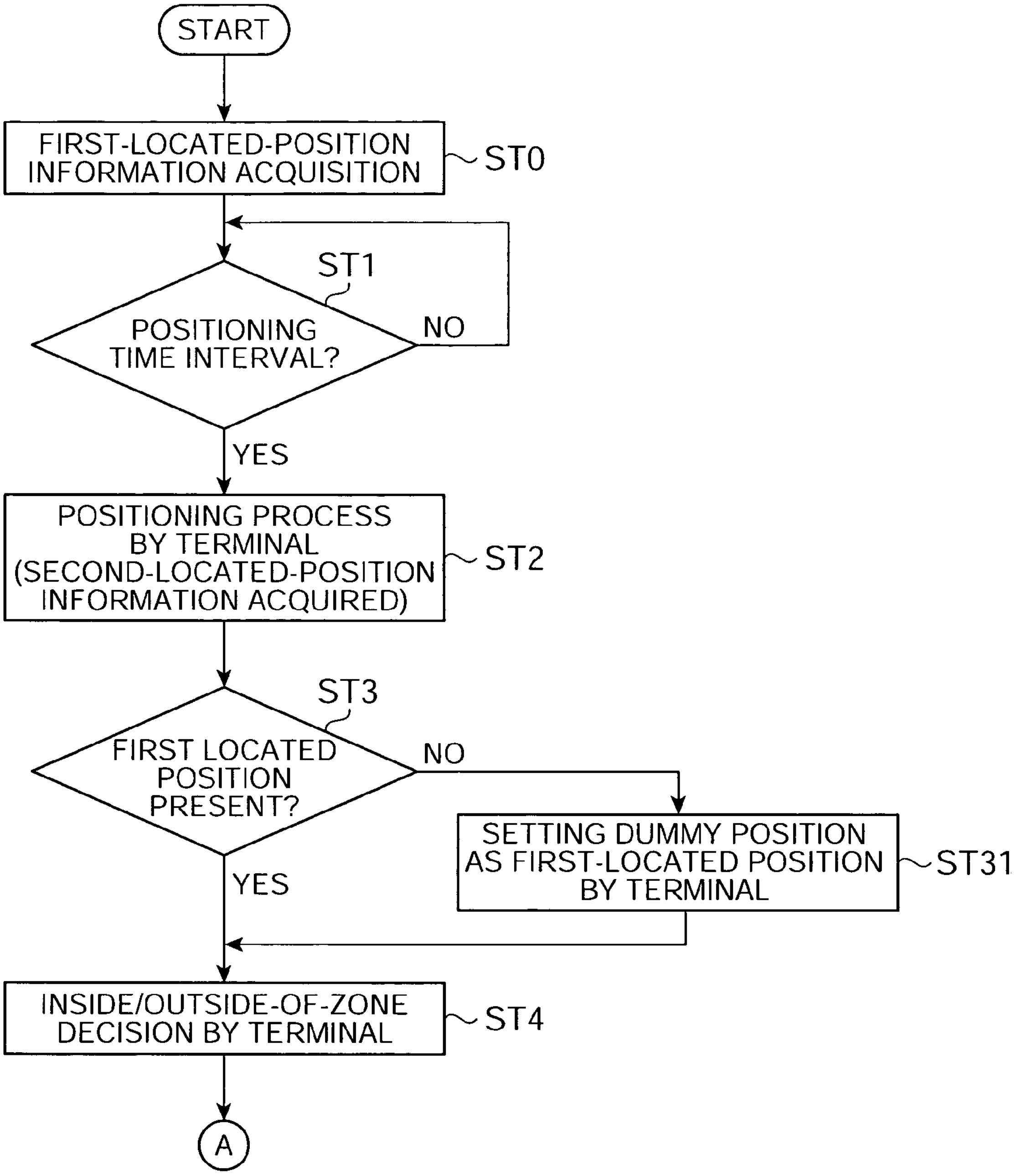
FIG. 9 is a schematic flowchart showing an operation example of the monitor system according to the first embodiment of the present invention.
Figure 10:
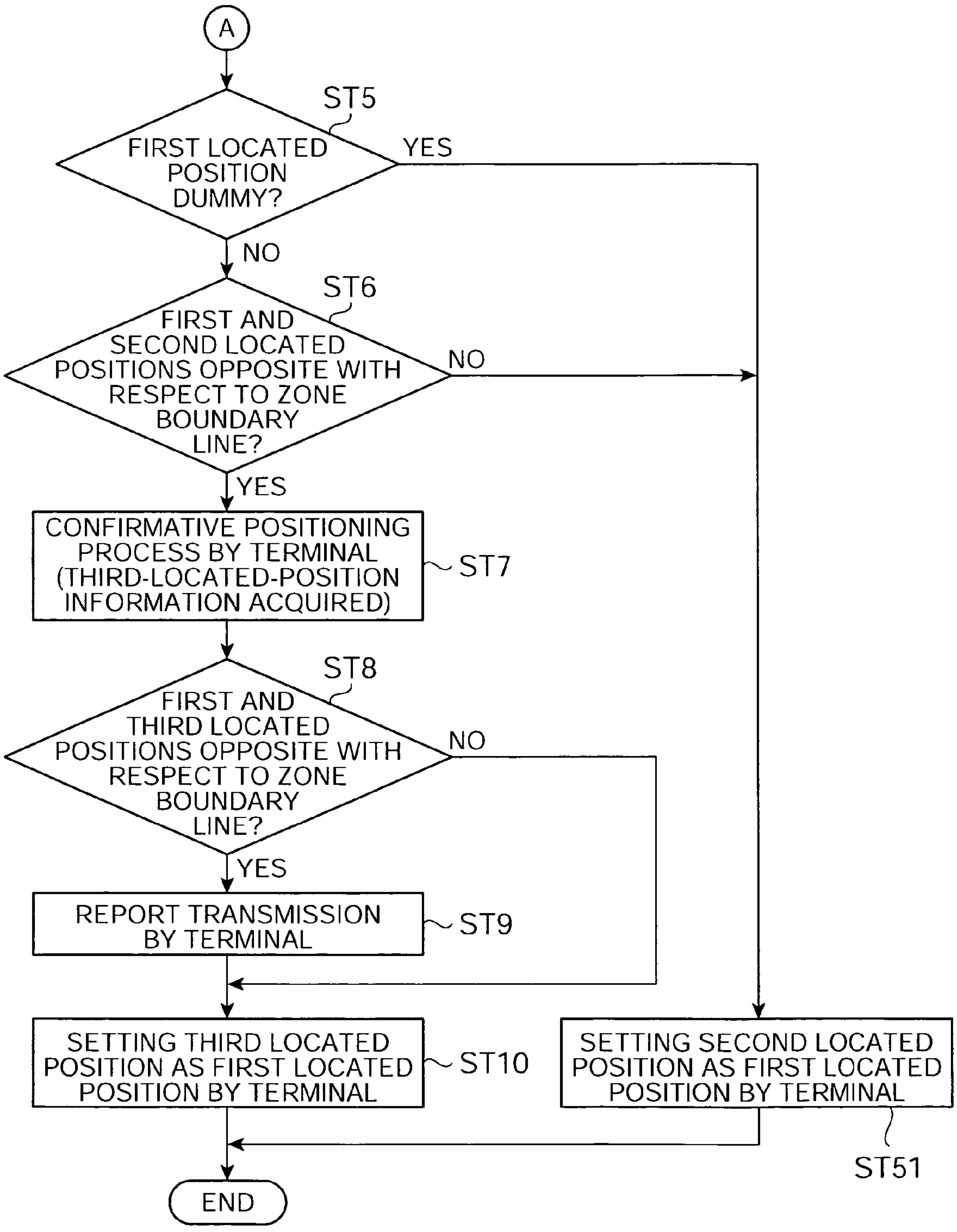
FIG. 10 is a schematic flowchart showing an operation example of the monitor system according to the first embodiment of the present invention.

FIGS. 9 and 10 are a schematic flowchart showing the operation of the monitor system 10 according to the present embodiment.

The below explanation is made on an assumption that the person A who is the owner of the automobile 20 parked the automobile 20 in the parking lot 22 as shown in FIG. 8(*a*), and thereafter someone other than the person A took the automobile 20 away from the parking lot 22 as shown in FIG. 8(*b*).

When the person A shown in FIG. 1 parks the automobile 20 in the parking lot 22 and activates the terminal 30 as he leaves, the terminal 30 arranged on the automobile 22 receives a position-related signal from the GPS satellites 12*a*-12*d*. Accordingly. The terminal 30 executes a terminal-end first-located position information acquiring step, which is step ST0 in FIG. 9. In this step ST0, the terminal 30 locates its current position and acquires the first-located position information 145, which indicates a first-located position.

As shown in FIG. 8(*a*), the first-located position is inside the parking lot 22, in other words inside the permissive moving zone. Also, the first-located position information 145 correctly indicates that the first-located position is inside the parking lot 22.

Then, in step ST1, the terminal 30 determines whether the positioning time interval, which is indicated by the positioning interval information 142 shown in FIG. 7 and which is 3 minutes in this embodiment, has lapsed after the first-located position is located. Once the positioning time interval has lapsed, the terminal 30 executes step ST2, which is an example of the terminal-end second-located position information acquiring step for acquiring the second-located position information 147, which indicates a second-located position of the movable object.

As shown in FIG. 8(*b*), the second-located position is a position outside the parking lot 22, which is the permissive moving zone. Also, the second-located position information 147 correctly indicates that the second-located position is outside the parking lot 22.

Subsequently, in step ST3, the terminal 30 decides whether the first-located position is stored in the first-located position information storing file 144 shown in FIG. 7. If the first-located position is stored, the terminal 30 executes step ST4, which is an example of the terminal-end inside/outside-of-predetermined-zone deciding step. In step ST4, it is determined whether or not the condition of the third-located position acquiring information 151, which is that the first-located position is within the monitor zone and the second-located position is outside the monitor zone, is satisfied.

As described above, because the first-located position information 145 correctly indicates that the first-located position is inside the parking lot 22, the terminal control section 130 decides that the first-located position is within the permissive moving zone. Furthermore, since the second-located position information 147 correctly indicates that the second-located position is outside the parking lot 22, the terminal control section 130 decides that the second-located position is outside the permissive moving zone.

However, when the terminal control section 13 determines that the first-located position is within the permissive moving zone and that the second-located position is outside the permissive moving zone, the terminal 30 is still not allowed to send a reporting signal to the monitor terminal 80 carried by the person A. If a reporting signal is sent to the monitor terminal 80 immediately every time the terminal 30 determines that the second-located position is outside the permissive moving zone, the person A could end up making a report to the police unnecessarily due to an erroneous positioning if the second-located position contains errors and the actual terminal 30 is still within the parking lot 22.

Accordingly, the terminal 30 executes the following steps in order to confirm the current position of the movable object.

Namely, the terminal 30 in step ST5 determines whether the first-located position is not a dummy position, as shown in FIG. 10. When it is decided that the first-located position is not a dummy position, the terminal 30 in step ST6 then decides whether or not the condition that the first-located position is within the permissive moving zone and the second-located position is outside the permissive moving zone is satisfied.

When it is determined that this condition is satisfied, the terminal 30 locates the current position of the movable object without waiting for a lapse of the positioning time interval, thus executing a step ST7, which is an example of the terminal-end third-located position information acquiring step. In the terminal-end third-located position information acquiring step of step ST7, the third-located position information 153 that indicates a third-located position of the movable object is obtained.

As described above, because the condition that the first-located position is within the permissive moving zone and the second-located position is outside the permissive moving zone is satisfied, the terminal 30 acquires the third-located position information 153 immediately, which is approximately 1.5 seconds after completing the step ST6, without waiting for a lapse of the positioning time interval.

As shown in FIG. 8(*b*), the third-located position information 148 correctly indicates that third-located position is outside the permissive moving zone.

Subsequently, the terminal 30 executes step ST8, which is an example of the terminal-end inside/outside-of-predetermined-zone confirming step. In the terminal-end inside/outside-of-predetermined-zone confirming step, it is determined whether or not a condition that the first-located position is within the permissive moving zone and the third-located position is outside the permissive moving zone is satisfied.

In this case, as described above, the position indicated by the first-located position information is within the parking lot 22 or the permissive moving zone, and the position indicated by the third-located position information is outside the parking lot 22. In other words, the terminal 30 determines that a condition for sending a report signal has been satisfied.

Once the terminal 30 determines that the condition for sending a report signal is satisfied, the terminal 30 executes step ST9, which is an example of the terminal-end report step. In the terminal-end report step, a report signal is sent to the monitor terminal 80 that is monitoring the terminal 30 if the first-located position is within the permissive moving zone and the third-located position is outside the permissive moving zone.

This allows the monitor terminal 80 shown in FIG. 1 to receive the report signal. The person A is notified of the fact that the automobile 20 has been taken away from the parking lot 22 or the permissive moving zone, through a display on the display device 92 of the monitor terminal 80 or a sound through the speaker 94 shown in FIG. 4. Accordingly, the person A can take appropriate measures such as reporting to the police.

Moreover, because the third-located position was obtained to confirm that the movable object is outside the permissive moving zone in view of errors in positioning by the GPS device 42 shown in FIG. 6 that might have occurred at the time the second-located position is acquired, the terminal unit 30 can prevent an erroneous report from being sent.

This allows the person A's monitor terminal 80 to receive a report signal from the terminal 30 that is arranged on the automobile 20 only when the automobile 20 is actually taken away from the parking lot 22 and it is necessary to report to the police.

After completion of the step ST9, the third-located position acquired in the step ST7 is stored as a first-located position in the first-located position information storing file 145 in step ST10. In this manner, the first-located position information 145 can be updated.

Furthermore, if it is determined in step ST5 that a dummy position is set as a first-located position, or it is determined in step ST6 that a second-located position is within the permissive moving zone, the second-located position is stored as the first-located position in the first-located position information storing file 144 of FIG. 7. In this manner, the first-located position information 145 can be updated with actual position information.

Second Embodiment

A monitor system 11 in accordance with a second embodiment of the present invention will now be explained with reference to FIGS. 11-16. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 11:
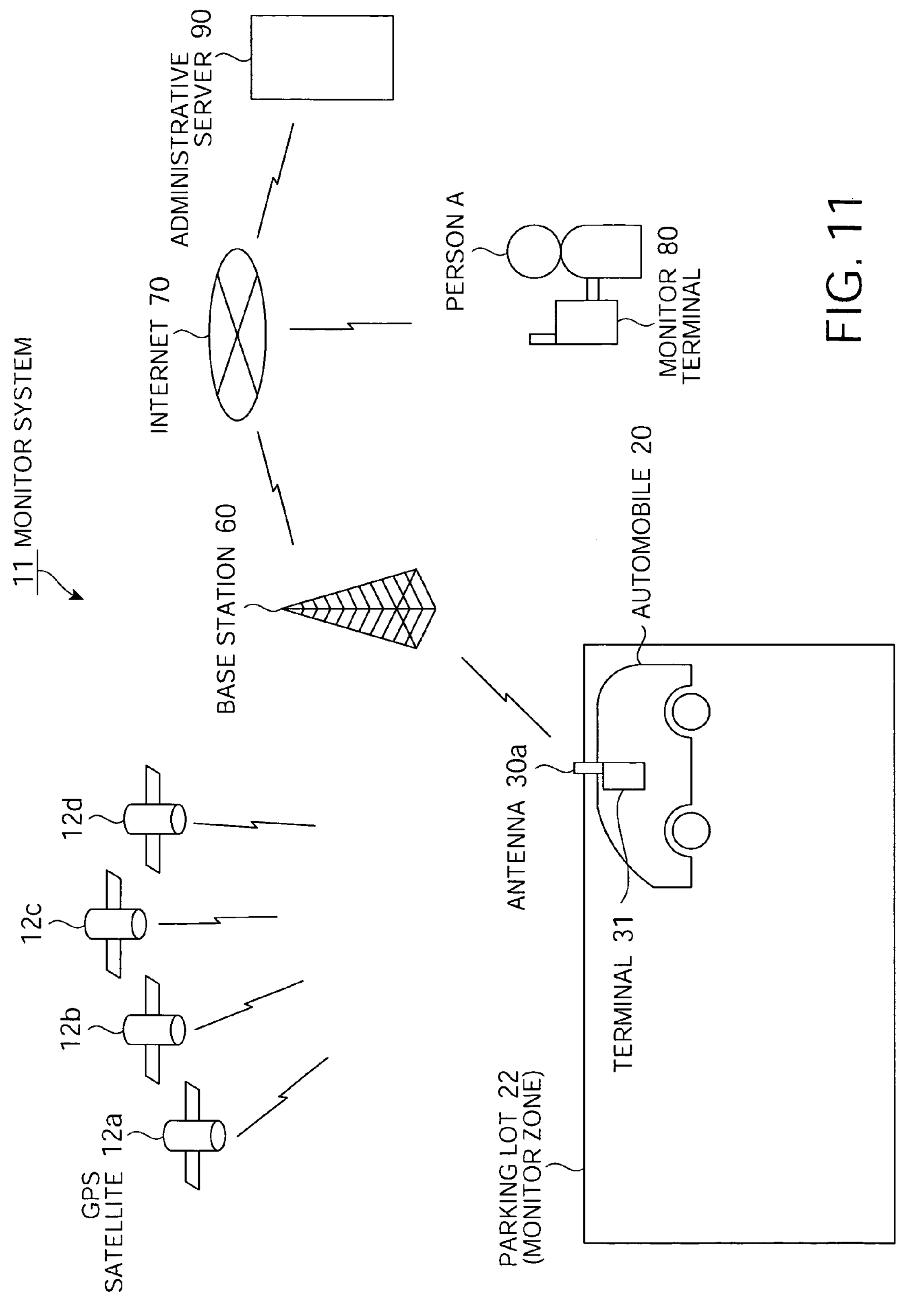
FIG. 11 is a schematic view showing a monitor system according to a second embodiment of the present invention.

FIG. 11 is a schematic diagram showing a monitor system 11 according to a second embodiment of the invention.

As shown in FIG. 11, the monitor system 11 has an administrative server 90, which can communicate with a terminal unit 31 and a monitor terminal 80. The administrative server 90 manages the position of the terminal 30, unlike in the monitor system 10 of the first embodiment. In this second embodiment, the terminal 31 merely receives position-related information from the GPS satellites 12*a*-12*d*. Locating of the current position of the terminal 30 is performed by the administrative server 90. In this manner, data processing to be performed by the terminal 31 is reduced. Thus, incorrect reporting is better prevented while enabling speedy reporting in the monitor system 11 of the second embodiment, as in the monitor system 10 of the first embodiment.

The arrangement of the monitor system 11 will now be explained in detail with particular emphasis on the differences between the monitor system 11 and the monitor system 10 of the first embodiment.

Major Software Configuration of Terminal 31

Figure 12:
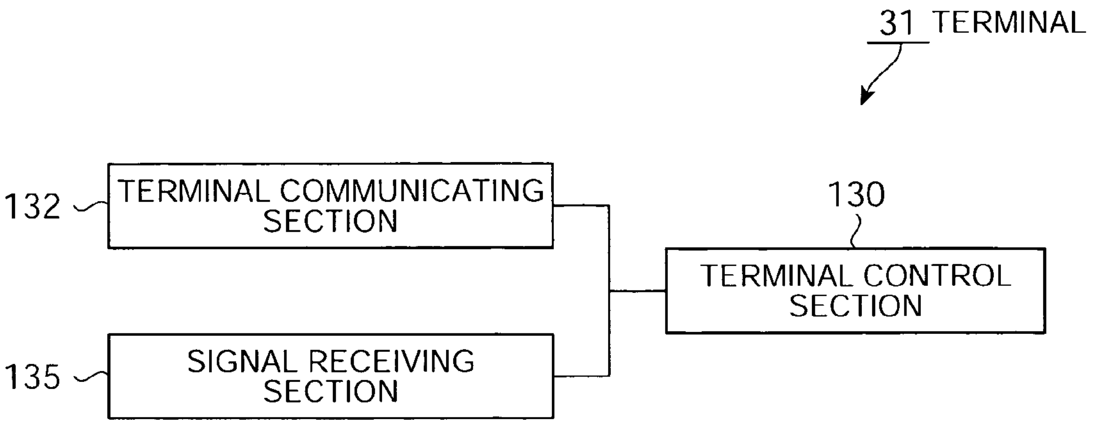
FIG. 12 is a schematic diagram showing a major software configuration of a terminal according to the second embodiment of the present invention.

FIG. 12 is a schematic diagram showing a major software configuration of the terminal 31.

As shown in FIG. 12, the terminal 31 has a terminal control section 130, a terminal communication section 132, and a signal receiving section 135. The signal receiving section 135 is an example of the position-related-signal receiving portion, and receives a position-related signal from the GPS satellites 12*a*-12*d*. The terminal 31 transfers the position-related signal received by the signal receiving section 135 to the administrative server 90 through the terminal communicating section 132. More specifically, the terminal 31 does not carry out the positioning operation of determining the current position of the terminal 31.

The terminal 31 is configured to receive a request for receiving a position-related signal and a transfer request (hereinafter referred to as position-related signal transfer request) from the administrative server 90 through the terminal communicating section 132. Once the position-related signal transfer request is received, the terminal 31 is configured to receive a position-related signal from the GPS satellites 12*a*-12*d* through the signal receiving section 135, and transfer the position-related signal to the administrative server 90.

Major Hardware Configuration of Administrative Server 90

Figure 13:
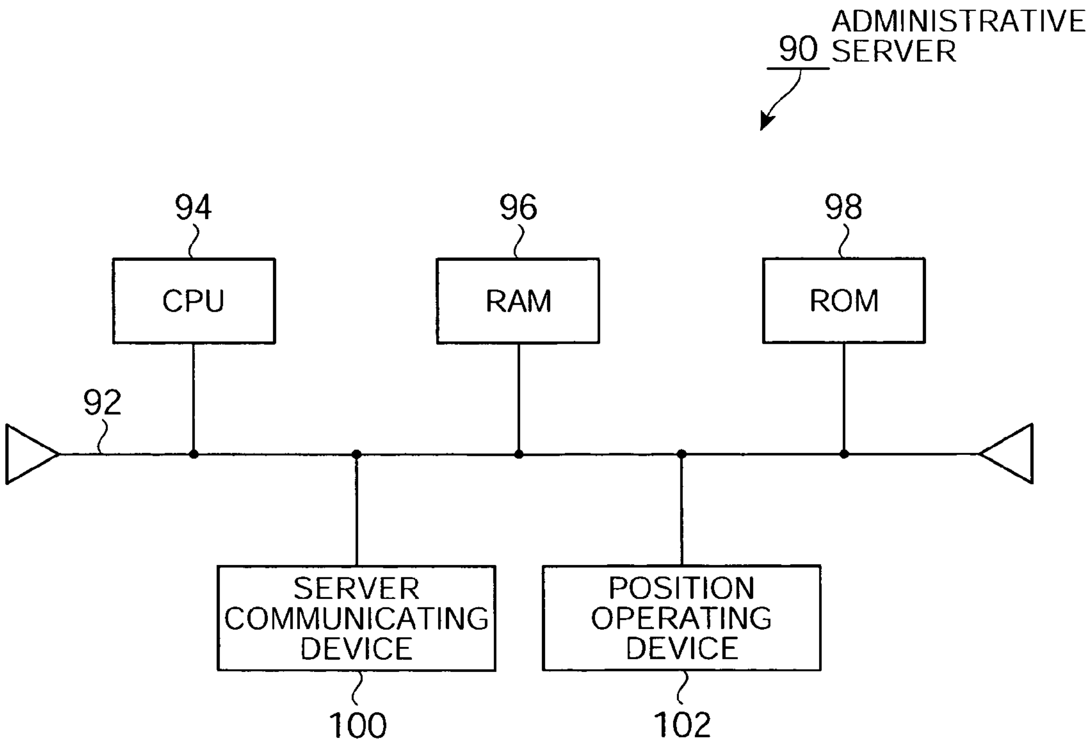
FIG. 13 is a schematic diagram showing a major hardware arrangement of an administrative server according to the second embodiment of the present invention.

FIG. 13 is a schematic diagram showing a major hardware configuration of the administrative server 90.

As shown in FIG. 13, the administrative server 90 has a bus 92. This bus 92 is connected with a CPU 94, a RAM 96, a ROM 98 and so on. The bus 92 is also connected with a server communicating device 100 and a position operating device 102. The administrative server 90 communicates with the terminal 31 and with the monitor terminal 80 via the server communicating device 100. Furthermore, the bus position operating device 102 is an example of the administrative-end positioning portion, and locates the current position of the terminal 31 using a position-related signal transferred from the terminal 31.

Major Software Configuration of Administrative Server 90

Figure 14:
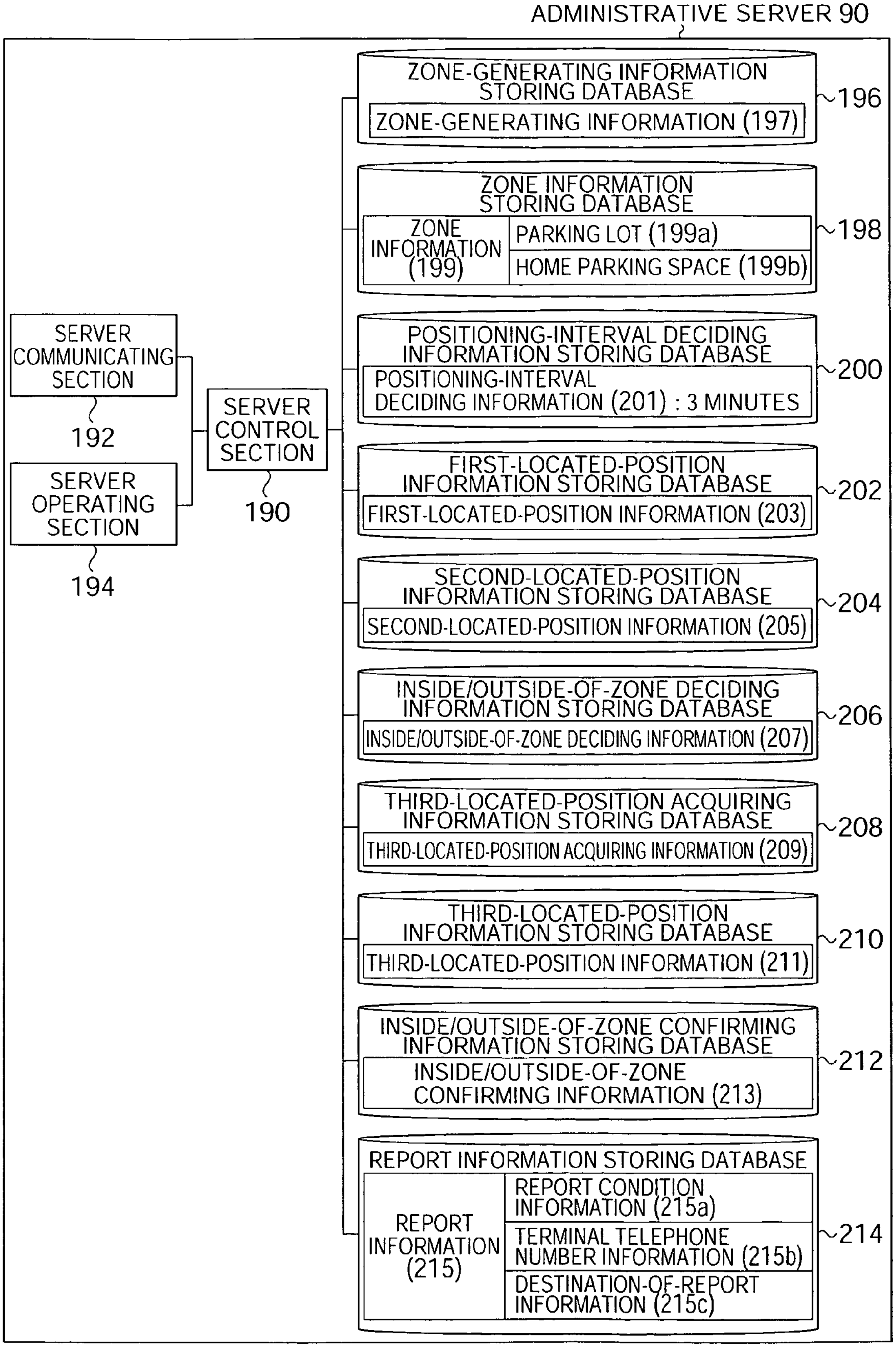
FIG. 14 is a schematic diagram showing a major software configuration of an administrative server according to the second embodiment of the present invention.

FIG. 14 is a schematic diagram showing a major software configuration of the administrative server 90.

As shown in FIG. 14, the administrative server 90 has a server communicating section 192 which corresponds to the server communicating device 100 shown in FIG. 13, and a position operating section 194 which corresponds to the position operating device 102 of FIG. 13. The position operating section 194 can operate and locate the current position of the terminal 31 based upon the position-related signal received from the terminal 31 through the server communicating section 192.

Furthermore, as the files that are controlled by the terminal control section 190, the administrative server 90 also has a zone-generating information storing file 196, a zone-generating information storing file 198, a positioning-interval deciding information storing file 200, a first-located position information storing file 202, a second-located position information storing file 204, an inside-outside-of-zone deciding information storing file 206, a third-located position acquiring information storing file 208, a third-located position information storing file 210, an inside/outside-of-zone confirming information storing file 212, and a report information storing file 214.

The zone-generating-information storing database 196 stores zone generating information 197 for generating zone information representative of a permissible moving zone of the automobile 20.

The zone-information storing database 198 is an example of the administrative-end predetermined-zone information storing portion, and stores generated zone information 199.

The positioning-interval-deciding-information storing database 200 is an example of the administrative-end positioning-interval-information storing portion, and stores positioning interval information 201, which indicates a positioning time interval of locating the current position of the terminal 31.

The server control section 190 can send the position-related-signal transfer request to the terminal 31 shown in FIG. 10 at a time interval of, for instance, 3 minutes, which is indicated by the positioning-interval-deciding information 201 stored in the positioning-interval-deciding information storing database 200.

The first-located position information storing database 202 is an example of the administrative-end first-located position information storing portion, and stores first-located position information 203, which indicates a first-located position acquired by locating the current position of the terminal 31.

The second-located position information storing database 204 is an example of the administrative-end second-located position information storing portion, which stores second-located position information 205. The second-located position information 205 indicates a second-located position that is acquired by locating the current position of the terminal 31 when the positioning time interval lapses after the first-located position is acquired.

The inside/outside-of-zone deciding information storing database 206 is an example of the administrative-end inside/outside deciding information storing portion, which stores inside/outside deciding information 207. The inside/outside deciding information 207 is used to determined whether or not the condition that the first-located position is within the permissible moving zone and the second-located position is outside the permissible moving zone is satisfied.

The third-located position acquiring information storing database 208 is an example of the terminal-end third-located position acquiring information storing portion, which stores third-located position acquiring information for acquiring third-located position information 209. The third-located position information 209 indicates a third-located position, and is acquired by locating the current position without waiting for a lapse of the positioning time interval if the above-described condition is satisfied.

When the condition that the first-located position is within the permissible moving zone and the second-located position is outside the permissible moving zone is satisfied, the server control section 190 sends the above-described request for transfer of position-related-signal to the terminal 31 shown in FIG. 10 based upon the third-located position acquiring information 209 stored in the third-located position-acquiring information storing database, without waiting for a lapse of the positioning time interval. The administrative server 90 stores the third-located position information 211 thus acquired to the third-located position information storing database 210.

The inside/outside-of-zone confirming information storing database 212 is an example of the administrative-end inside/outside-of-permissible-moving zone confirming information storing portion, which stores inside/outside-of-zone confirming information 213. The inside/outside-of-zone confirming information 213 is inside/outside-of-permissible-moving-zone confirming information which is used for deciding whether or not the condition that the first-located position is within the permissible moving zone and the third-located position is outside the permissible moving zone is satisfied.

The report information storing database 214 is an example of the administrative-end report information storing portion, which stores report information 215 for making a report to the monitor terminal 80 when the condition that the first-located position is within the permissible moving zone and the third-located position is outside the permissible moving zone is satisfied.

As shown in FIG. 14, the report information 215 stored in the report information storing database 214 includes report-condition information 215*a*, which indicates a condition for making a report, which in this embodiment is that the first-located position is within the permissible moving zone and the third-located position is outside the permissible moving zone.

The report information 215 also includes terminal telephone-number information 215*b*, which is identifying information for identifying the terminal 30 arranged on the automobile 20, which is the monitoring object. The report information 215 also includes destination-of-report information 215*c*, which indicates a telephone number of the monitor terminal 80 corresponding to the terminal telephone-number information 215*b*.

Operation of Monitoring System 11

The configuration of the monitor system 11 of the second embodiment is as described above. The operation of the monitor system 11 will now be explained referring to FIGS. 15 and 16, with a particular emphasis on operations that are different from those of the monitor system 10 of the first embodiment.

Figure 15:
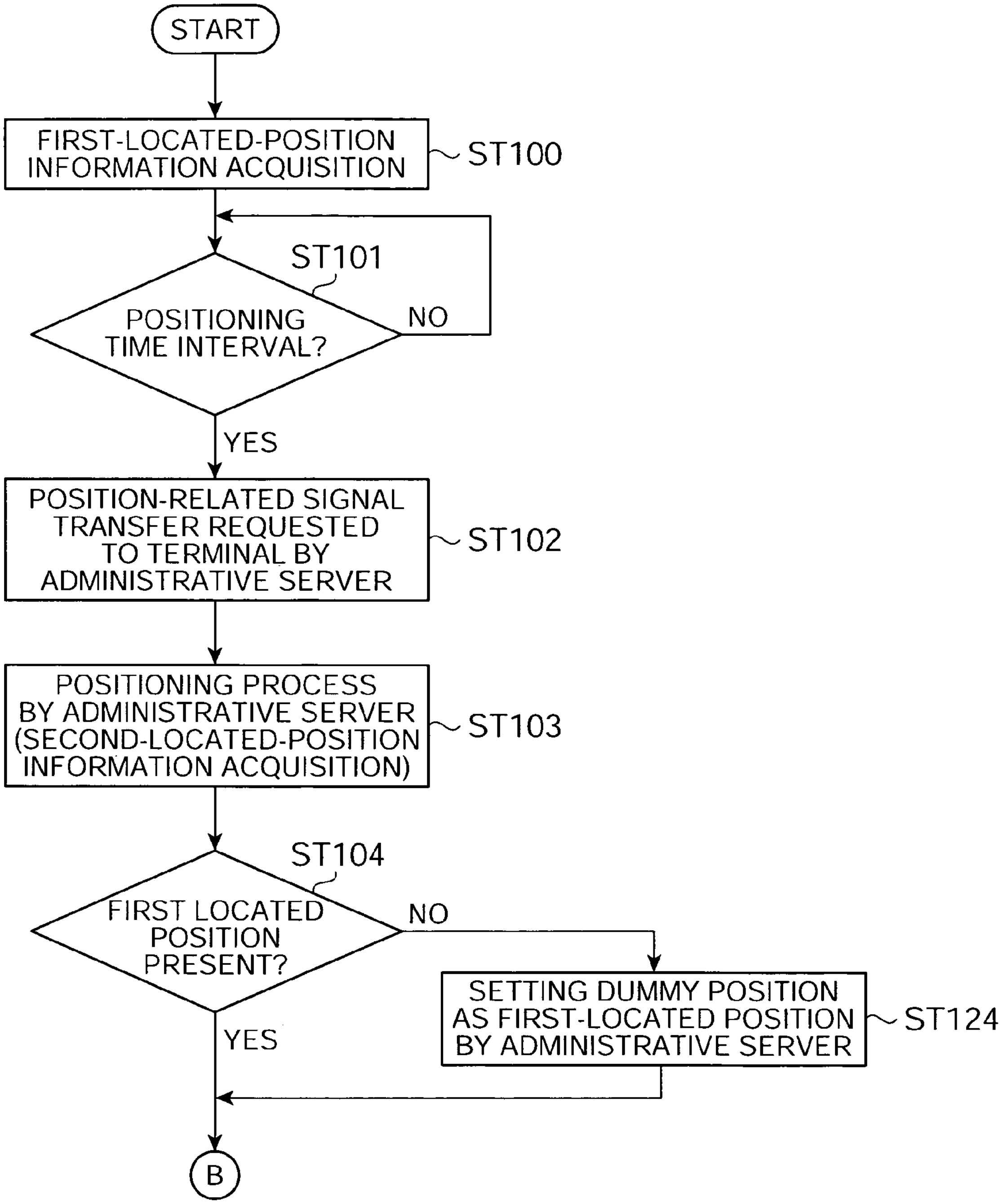
FIG. 15 is a schematic flowchart showing an operation example of the monitor system according to the second embodiment of the present invention.
Figure 16:
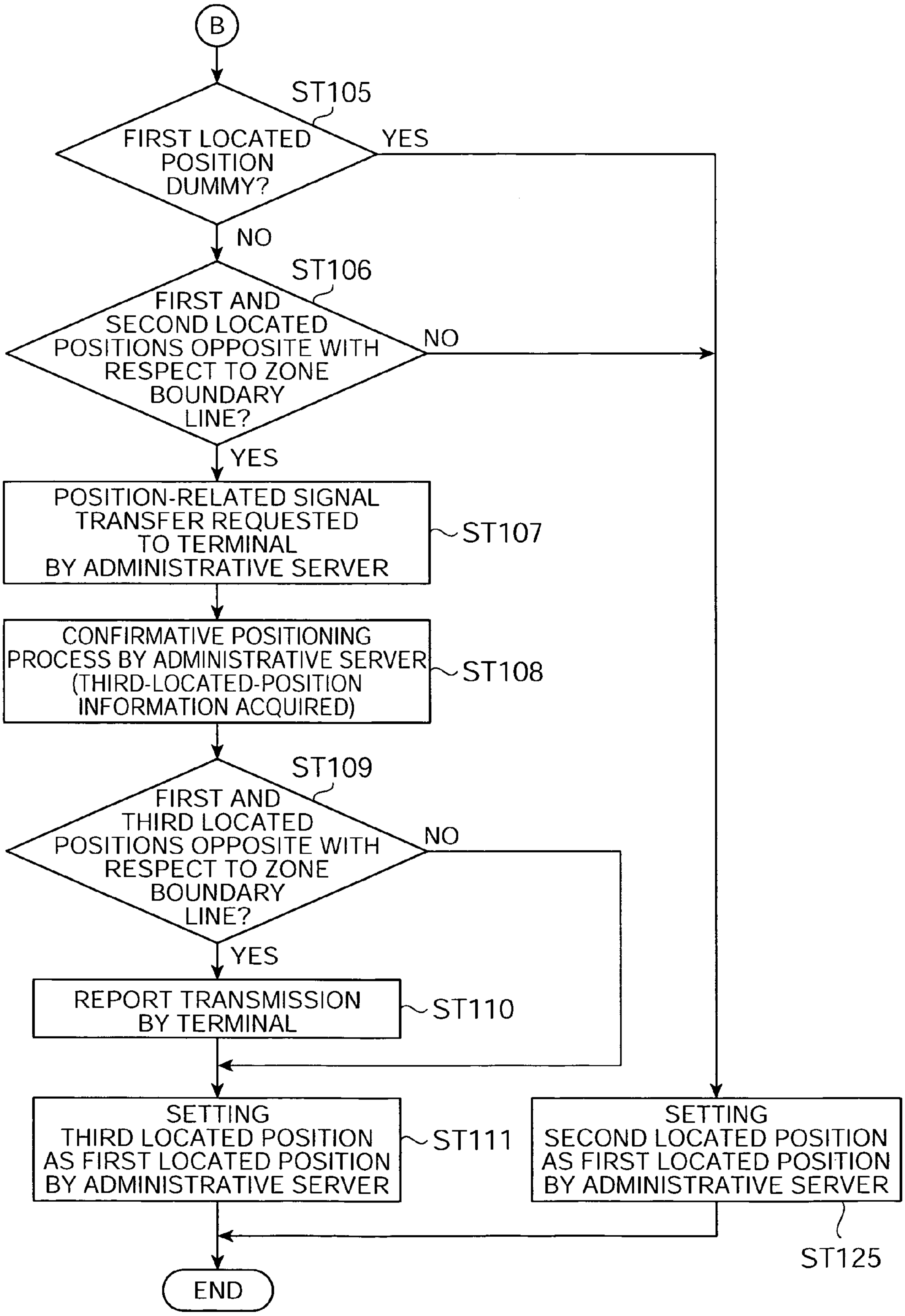
FIG. 16 is a schematic flowchart showing an operation example of the monitor system according to the second embodiment of the present invention.

FIGS. 15 and 16 are a schematic flowchart showing the operation of the monitor system 11 of the second embodiment.

Explanation will be made below on an assumption that the person A, who is an owner of the automobile 20, parks the automobile 20 in the parking lot 22 as shown in FIG. 8(*a*), and thereafter someone other than the person A takes the automobile 20 away from the parking lot 22 as shown in FIG. 8(*b*), similarly to the first embodiment.

When the person A of FIG. 11 parks the automobile 20 in the parking lot 22 and then activates the terminal 31 as the person A leaves the automobile 20, the terminal 31 arranged on the automobile 22 receives a position-related signal transfer request from the administrative server 90. The terminal 31 receives a position-related signal from the GPS satellites 12*a*-12*d*, and transfers the position-related signal to the administrative server 90 (step ST100 in FIG. 15).

In other words, the step ST100 is an example of the administrative-end positioning step, in which the current position of the terminal 31 is located based on the position-related signal that the terminal 31 has received from the GPS satellite 12*a*-12*d*.

Subsequently, the administrative server 90 executes steps ST101 to ST103, which are an example of administrative-end second-located position-acquiring step. In other words, the administrative server 90 locates the current position of the terminal 31 upon a lapse of the positioning time interval after the first-located position is acquired. In this manner, the second-located position information indicative of a second-located position is acquired.

More specifically, the administrative server 90 determines whether a positioning time interval has lapsed (step ST101), and sends a related-position signal transfer request to the terminal 31 (step ST102) once the positioning time interval has lapsed. Then, the administrative server 90 locates the current position of the terminal 31 and acquires the second-located position information, based on the related-position signal received from the terminal 31 (step ST103).

Subsequently, the administrative server 90 determines the presence of the first-located position (step ST104) and confirms that the first-located position is not a dummy position (step ST105 in FIG. 16).

Then, the administrative server 90 executes an administrative-end inside/outside-of-predetermined-zone deciding step ST106 to decide whether or not the condition that the first-located position is within the permissible moving zone and the second-located position is outside the permissible moving zone is satisfied.

Here, the first-located position information 203 indicates a position inside the permissible moving zone as shown in FIG. 8(*a*) while the second-located position information 205 indicates a position outside the permissible moving zone as shown in FIG. 8(*b*). Accordingly, the administrative server 90 determines that the condition that the first-located position is within the permissible moving zone and the second-located position is outside the permissible moving zone is satisfied.

Subsequently, when the condition that the first-located position is within the permissible moving zone and the second-located position is outside the permissible moving zone is satisfied, the administrative server 90 executes steps ST107 to ST108, which are an example of administrative-end third-located position information acquiring step, before a lapse of the positioning time interval, with a position-related signal sent from the terminal 31. In this manner, the current position of the terminal 31 is located, and the third-located position information that indicates a third-located position is acquired (FIG. 16).

Subsequently, the administrative server 90 executes step ST109, which is an example of the administrative-end inside/outside-of-predetermined-zone confirming step, to determine whether or not the condition that the first-located position is within the permissible moving zone and the third-located position is outside the permissible moving zone is satisfied.

Furthermore, when the first-located position is within the permissible moving zone and the third-located position is outside the permissible moving zone, the administrative sever 90 executes step ST110, which is an example of the administrative-end report step, to make a report to the monitor terminal 80.

As explained above, in the monitor system 11, the administrative sever 90 acquires the first-located position information of the terminal 31. Then, the administrative server 90 makes a report to the monitor terminal 80 carried by the person A. This allows for accurate and quick report to the monitor terminal 80 without imposing an increased information processing load to the terminal 31.

Unlike this embodiment, the monitor system of the present invention may monitor the movement of the monitoring object from outside a predetermined zone to inside the predetermined zone. Furthermore, the monitor system of the present invention may monitor the movement of the monitoring object from outside the predetermined zone to inside the predetermined zone, as well as from inside the predetermined zone to outside the predetermined zone.

Program and Computer-Readable Recording Medium

A control program of the present invention is adapted to be installed in a computer to allow the terminal unit to execute, for example, the terminal-end first-located position information acquiring step, the terminal-end second-located position information acquiring step, the terminal-end inside/outside-of-predetermined-zone deciding step, the terminal-end third-located position information acquiring step, the terminal-end inside/outside-of-predetermined-zone deciding step, and the terminal-end report step.

Also, a computer-readable recording medium or the like can be provided to record such a terminal-device control program.

Meanwhile, a control program for the administrative device in accordance with the present invention is provided for allowing the administrative device to execute the administrative-end first-located position information acquiring step, the administrative-end second-located position information acquiring step, the administrative-end inside/outside-of-predetermined-zone deciding step, the administrative-end third-located position information acquiring step, the administrative-end inside/outside-of-predetermined-zone deciding step, administrative-end report step and so on of the foregoing operation example.

Also, a computer-readable recording medium or the like can be provided to record such a administrative-device control program.

The program storage media that allow those control programs for the terminal unit or the administrative device to be installed in the computer such that these control programs can be executed by the computer, can be realized not only by a flexible disk sold under the trade mark FLOPPY DISC and package media such as CD-ROM (Compact Disk Read Only Memory), CD-R (Compact Disk-Recordable), CD-RW (Compact Disc-Rewritable) and DVD (Digital Versatile Disc) but also as a semiconductor memory, magnetic disc or magneto-optical disc that are capable of storing the programs temporarily or permanently.

The present invention is not limited to the embodiments described above. Furthermore, the embodiments may be configured to be combined with one another.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-120329. The entire disclosure of Japanese Patent Application No. 2004-120329 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A monitor system configured to monitor a monitoring object with a position-related signal from a satellite positioning system, comprising:

a terminal unit adapted to be attached to the monitoring object; and a monitor apparatus configured to communicate with the terminal unit to monitor a position of the terminal unit, wherein the terminal unit includes a terminal-end positioning portion configured to receive a position-related signal from the position-information satellite and locate a position of the terminal unit, a terminal-end predetermined-zone information storing portion configured to store predetermined zone information, a terminal-end positioning-interval information storing portion configured to store positioning-interval information, which indicates a positioning time interval at which a position of the terminal unit is to be located;

a terminal-end first-located position information storing portion configured to store first-located position information, a terminal-end second-located position information storing portion configured to store second-located position information, the second-located position information being obtained upon a lapse of the positioning time interval after the first-located position information is obtained, a terminal-end inside/outside-of-predetermined-zone deciding information storing portion configured to store inside/outside-of-predetermined-zone deciding information for determining whether the first and second-located positions are within the predetermined zone, a terminal-end third-located position information acquiring information storing portion configured to store third-located position information acquiring information, which is a condition for acquiring third-located position information, the third-located position information acquiring information being a condition that one of the first and second-located positions is within the predetermined zone and the other of the first and second-located positions is outside the predetermined zone, the third-located position information being acquired before a lapse of the positioning time interval after the second-located position is located if the condition of the third-located position information acquiring information is satisfied, a terminal-end inside/outside-of-predetermined-zone confirming information storing portion configured to store inside/outside-of-predetermined-zone confirming information, which is a condition that one of the first and third-located positions is within the predetermined zone and the other of the first and third-located positions is outside the predetermined zone, and a terminal-end report information storing portion configured to store report information to be reported to the monitor apparatus if the condition of the inside/outside-of-predetermined-zone confirming information is satisfied.

2. The monitor system according to claim 1, wherein the terminal-end third-located position information acquiring information is a condition that the first-located position is within the predetermined zone and the second-located position is outside the predetermined zone, and the terminal-end inside/outside-of-predetermined-zone confirming information is a condition that the first-located position is within the predetermined zone and the third-located position is outside the predetermined zone.

3. The monitor system according to claim 1, wherein the predetermined zone is under control of a person monitoring the predetermined zone.

4. The monitor system according to claim 1, wherein the predetermined zone is situated indoors.

5. A terminal unit adapted to be attached to a monitoring object, which is adapted to be monitored by a monitor system with a position-related signal from a satellite positioning system, the terminal unit comprising:

a terminal-end positioning portion configured to receive a position-related signal from the satellite positioning system and locate a position of the terminal unit;

a terminal-end predetermined-zone information storing portion configured to store predetermined-zone information;

a terminal-end positioning-interval information storing portion configured to store positioning-interval information, which indicates a positioning time interval at which a position of the terminal unit is to be located;

a terminal-end first-located position information storing portion configured to store first-located position information;

a terminal-end second-located position information storing portion configured to store second-located position information, the second-located position information being obtained upon a lapse of the positioning time interval after the first-located position is located;

a terminal-end inside/outside-of-predetermined-zone deciding information storing portion configured to store inside/outside-of-predetermined-zone deciding information for determining whether the first and second-located positions are within the predetermined zone;

a terminal-end third-located position information acquiring information storing portion configured to store third-located position information acquiring information for acquiring third-located position information, which is a condition for acquiring third-located position information, the third-located position information acquiring information being a condition that one of the first and second-located positions is within the predetermined zone and the other of the first and second-located positions is outside the predetermined zone, the third-located position information being acquired before a lapse of the positioning time interval after the second-located position is located if the condition of the third-located position information acquiring information is satisfied;

a terminal-end inside/outside-of-predetermined-zone confirming information storing portion configured to store inside/outside-of-predetermined-zone confirming information, which is a condition that one of the first and third-located positions is within the predetermined zone and the other of the first and third-located positions is outside the predetermined zone; and a terminal-end report information storing portion configured to store report information to be reported to the monitor apparatus if the condition of the inside/outside-of-predetermined-zone confirming information is satisfied.

6. The terminal unit according to claim 5, wherein the terminal-end third-located position information acquiring information is a condition that the first-located position is within the predetermined zone and the second-located position is outside the predetermined zone, and the terminal-end inside/outside-of-predetermined-zone confirming information is a condition that the first-located position is within the predetermined zone and the third-located position is outside the predetermined zone.

7. A monitor system control method, comprising:

a first-located position information acquiring step for acquiring first-located position information, which indicates a first-located position of a terminal unit attached to a monitoring object, with a position-related signal received from a satellite positioning system;

a second-located position information acquiring step for acquiring second-located position information, which indicates a second-located position of the terminal unit upon a lapse of a positioning time interval after the first-located position is acquired;

an inside/outside-of-predetermined-zone deciding step for determining whether a condition that one of the first and second-located positions is within the predetermined zone and the other of the first and second-located positions is outside the predetermined zone is satisfied;

a third-located position information acquiring step for acquiring third-located position information, which indicates a third-located position of the terminal unit, before a lapse of the positioning time interval if one of the first and second-located positions is within the predetermined zone and the other of the first and second-located positions is outside the predetermined zone;

an inside/outside-of-predetermined-zone confirming step for determining whether a condition that one of the first and third-located positions is within the predetermined zone and the other of the first and third-located positions is outside the predetermined zone; and a reporting step for making a report to a monitor apparatus that is monitoring a position of the terminal unit if one of the first and third-located positions is within the predetermined zone and the other of the first and third-located positions is outside the predetermined zone.

8. The monitor system control method according to claim 7, wherein in the third-located position information acquiring step, the third-located position information is acquired if the first-located position is within the predetermined zone and the second-located position is outside the predetermined zone, and in the reporting step, a report is made to the monitor apparatus if the first-located position is within the predetermined zone and the third-located position is outside the predetermined zone.

9. The monitor system control method according to claim 7, wherein the first-located position information acquiring step, the second-located position information acquiring step, the inside/outside-of-predetermined-zone deciding step, the third-located position information acquiring step, the inside/outside-of-predetermined-zone confirming step, and the reporting step are performed by the terminal unit.

10. The monitor system control method according to claim 7, wherein:

the first, second, and third-located position information acquiring steps are performed by an administrative apparatus by receiving the position-related signal that the terminal unit received from the satellite positioning system, the administrative apparatus being configured to locate a position of the terminal unit, and the inside/outside-of-predetermined-zone deciding step, the inside/outside-of-predetermined-zone confirming step, and the reporting step are performed by the administrative apparatus.

11. A terminal unit control program configured to cause a terminal unit of a monitor system to execute:

a terminal-end first-located position information acquiring step for acquiring first-located position information, which indicates a first-located position of a terminal unit that is attached to a monitoring object, with a position-related signal received from a satellite positioning system;

a terminal-end second-located position information acquiring step for acquiring second-located position information, which indicates a second-located position of the terminal unit upon a lapse of a positioning time interval after the first-located position is located;

a terminal-end inside/outside-of-predetermined-zone deciding step for determining whether a condition that one of the first and second-located positions is within the predetermined zone and the other of the first and second-located positions is outside the predetermined zone is satisfied;

a terminal-end third-located position information acquiring step for acquiring third-located position information before a lapse of the positioning time interval if one of the first and second-located positions is within the predetermined zone and the other of the first and second-located positions is outside the predetermined zone;

a terminal-end inside/outside-of-predetermined-zone confirming step for determining whether a condition that one of the first and third-located positions is within the predetermined zone and the other of the first and third-located positions is outside the predetermined zone; and a terminal-end reporting step for making a report to a monitor apparatus that is monitoring a position of the terminal unit if one of the first and third-located positions is within the predetermined zone and the other of the first and third-located positions is outside the predetermined zone.

12. The terminal unit control program according to claim 11, wherein in the terminal-end third-located position information acquiring step, the third-located position information is acquired if the first-located position is within the predetermined zone and the second-located position is outside the predetermined zone, and in the terminal-end reporting step, a report is made to the monitor apparatus if the first-located position is within the predetermined zone and the third-located position is outside the predetermined zone.

13. A computer-readable recording medium having recorded therein the terminal unit control program according to claim 11.

14. A monitor system configured to monitor a monitoring object with a position-related signal from a satellite positioning system, comprising:

a terminal unit adapted to be attached to the monitoring object;

a monitor apparatus configured to communicate with the terminal unit to monitor a position of the terminal unit; and an administrative apparatus configured to communicate with the terminal unit and the monitor apparatus and to locate a position of the terminal unit, wherein the terminal unit includes a position-related signal receiving portion configured to receive a position-related signal from the position-information satellite, and the administrative apparatus includes an administrative-end predetermined-zone information storing portion configured to store predetermined-zone information of the monitoring object, an administrative-end positioning portion configured to locate a position of the terminal unit based on the position-related signal sent from the terminal unit, an administrative-end positioning-interval information storing portion configured to store positioning-interval information, which indicates a positioning time interval at which a position of the terminal unit is to be located, an administrative-end first-located position information storing portion configured to store first-located position information, an administrative-end second-located position information storing portion configured to store second-located position information, the second-located position information being obtained upon a lapse of the positioning time interval after the first-located position is located, an administrative-end inside/outside-of-predetermined-zone deciding information storing portion configured to store inside/outside-of-predetermined-zone deciding information for determining whether the first and second-located positions are within the predetermined zone, an administrative-end third-located position information acquiring information storing portion configured to store third-located position information acquiring information for acquiring third-located position information, which is a condition for acquiring third-located position information, the third-located position information acquiring information being a condition that one of the first and second-located positions is within the predetermined zone and the other of the first and second-located positions is outside the predetermined zone, the third-located position information being acquired, by receiving the position-related signal from the terminal unit, before a lapse of the positioning time interval after the second-located position information is acquired if the condition of the third-located position information acquiring information is satisfied, an administrative-end inside/outside-of-predetermined-zone confirming information storing portion configured to store inside/outside-of-predetermined-zone confirming information, which is a condition that one of the first and third-located positions is within the predetermined zone and the other of the first and third-located positions is outside the predetermined zone, and an administrative-end report information storing portion configured to store report information to be reported to the monitor apparatus if the condition of the inside/outside-of-predetermined-zone confirming information is satisfied.

15. The monitor system according to claim 14, wherein the administrative-end third-located position information acquiring information is a condition that the first-located position is within the predetermined zone and the second-located position is outside the predetermined zone, and the administrative-end inside/outside-of-predetermined-zone confirming information is a condition that the first-located position is within the predetermined zone and the third-located position is outside the predetermined zone.

16. An administrative apparatus configured to communicate with a terminal unit that is attached to a monitoring object and with a monitor apparatus that is configured to monitor a position of the terminal unit with a position-related signal from a satellite positioning system, the administrative apparatus comprising:

an administrative-end predetermined-zone information storing portion configured to store predetermined-zone information of the monitoring object;

an administrative-end positioning portion configured to locate a position of the terminal unit based the position-related signal sent from the terminal unit;

an administrative-end positioning-interval information storing portion configured to store positioning-interval information, which indicates a positioning time interval at which a position of the terminal unit is to be located;

an administrative-end first-located position information storing portion configured to store first-located position information;

an administrative-end second-located position information storing portion configured to store second-located position information, the second-located position information being obtained upon a lapse of the positioning time interval after the first-located position is located;

an administrative-end inside/outside-of-predetermined-zone deciding information storing portion configured to store inside/outside-of-predetermined-zone deciding information for determining whether the first and second-located positions are within the predetermined zone;

an administrative-end third-located position information acquiring information storing portion configured to store the third-located position information acquiring information for acquiring third-located position information, the third-located position information acquiring information being a condition that one of the first and second-located positions is within the predetermined zone and the other of the first and second-located positions is outside the predetermined zone, the third-located position information being acquired, by receiving the position-related signal from the terminal unit, before a lapse of the positioning time interval after the second-located position information is acquired if the condition of the third-located position information acquiring information is satisfied;

an administrative-end inside/outside-of-predetermined-zone confirming information storing portion configured to store inside/outside-of-predetermined-zone confirming information, which is a condition that one of the first and third-located positions is within the predetermined zone and the other of the first and third-located positions is outside the predetermined zone; and an administrative-end report information storing portion configured to store report information to be reported to the monitor apparatus if the condition of the inside/outside-of-predetermined-zone confirming information is satisfied.

17. The administrative apparatus according to claim 16, wherein the administrative-end third-located position information acquiring information is a condition that the first-located position is within the predetermined zone and the second-located position is outside the predetermined zone, and the administrative-end inside/outside-of-predetermined-zone confirming information is a condition that the first-located position is within the predetermined zone and the third-located position is outside the predetermined zone.

18. An administrative apparatus control method comprising:

an administrative-end first-located position information acquiring step for locating a position of the terminal unit, which is attached to a monitoring object, by receiving a position-related signal which the terminal unit received from a satellite positioning system;

an administrative-end second-located position information acquiring step for acquiring second-located position information upon a lapse of a positioning time interval after the first-located position is acquired;

an administrative-end inside/outside-of-predetermined-zone deciding step for determining whether a condition that one of the first and second-located positions is within the predetermined zone and the other of the first and second-located positions is outside the predetermined zone is satisfied;

an administrative-end third-located position information acquiring step for acquiring third-located position information by receiving the position-related signal from the terminal unit before a lapse of the positioning time interval if one of the first and second-located positions is within the predetermined zone and the other of the first and second-located positions is outside the predetermined zone;

an administrative-end inside/outside-of-predetermined-zone confirming step for determining whether a condition that one of the first and third-located positions is within the predetermined zone and the other of the first and third-located positions is outside the predetermined zone; and an administrative-end reporting step for making a report to a monitor apparatus that is monitoring a position of the terminal unit if one of the first and third-located positions is within the predetermined zone and the other of the first and third-located positions is outside the predetermined zone.

19. The administrative apparatus control program according to claim 18, wherein in the administrative-end third-located position information acquiring step, the third-located position information is acquired if the first-located position is within the predetermined zone and the second-located position is outside the predetermined zone, and in the administrative-end reporting step, a report is made to the monitor apparatus if the first-located position is within the predetermined zone and the third-located position is outside the predetermined zone.

20. A computer-readable recording medium having recorded therein the administrative apparatus control program according to claim 19.

* * * * *